United States Patent
Molloy et al.

(10) Patent No.: US 12,522,328 B2
(45) Date of Patent: Jan. 13, 2026

(54) DATA ACQUISITION APPARATUS AND METHOD

(71) Applicant: Glas Ocean Electric Inc., Halifax (CA)

(72) Inventors: Susan Molloy, Halifax (CA); Aaron MacNeill, Bedford (CA); Dom Molloy, Highlands Ranch, CO (US); Christopher Whidden, Middle Sackville (CA)

(73) Assignee: Glas Ocean Electric Inc., Nova Scotia (CA)

( * ) Notice: Subject to any disclaimer, the term of this patent is extended or adjusted under 35 U.S.C. 154(b) by 298 days.

(21) Appl. No.: 18/202,105

(22) Filed: May 25, 2023

(65) Prior Publication Data

US 2023/0406464 A1 Dec. 21, 2023

Related U.S. Application Data

(60) Provisional application No. 63/346,696, filed on May 27, 2022.

(51) Int. Cl.
*B63B 79/20* (2020.01)
*B63B 79/10* (2020.01)
*B63B 79/30* (2020.01)

(52) U.S. Cl.
CPC ............. *B63B 79/20* (2020.01); *B63B 79/10* (2020.01); *B63B 79/30* (2020.01)

(58) Field of Classification Search
CPC .......... B63B 79/20; B63B 79/10; B63B 79/30
USPC ....................................................... 340/984
See application file for complete search history.

(56) References Cited

U.S. PATENT DOCUMENTS

| | | | |
|---|---|---|---|
| 7,047,114 B1 | 5/2006 | Rogers | |
| 8,798,847 B2 | 8/2014 | Isaac | |
| 8,886,733 B2 | 11/2014 | Jeon et al. | |
| 11,598,282 B1 * | 3/2023 | Josselyn | B63B 79/20 |

(Continued)

FOREIGN PATENT DOCUMENTS

| | | |
|---|---|---|
| EP | 3081958 | 8/2019 |
| WO | WO2008/096376 A1 | 8/2008 |

OTHER PUBLICATIONS

Advanced Lightweight Encryption Algorithms for IOT Devices: Survey, Challenges and Solutions, A Singh et al, Springer-Verlag Berlin Heidelberg 2017, Apr. 18, 2017.

*Primary Examiner* — Eric Blount
(74) *Attorney, Agent, or Firm* — Smart & Biggar LP

(57) ABSTRACT

A method of estimating an operational parameter of a subject vessel, including receiving at least one vessel data item of a set of vessel data from a subject vessel; associating the vessel data with a class; generating an estimated equivalent for at least one vessel data item using a machine learning model trained using a database of data from vessels of the class of the subject vessel; and providing the estimated equivalent to a user. The vessel data item may be acquired by a dedicated data acquisition unit on a marine vessel. The data acquisition unit may be part of a system for analysing marine data. In another aspect, a method of detecting an abnormality is provided, including receiving hydrophone data from a subject vessel; detecting an abnormality in the hydrophone data; associating the abnormality with an operational system of the subject vessel; and generating a maintenance alert identifying the operational system for further attention.

22 Claims, 26 Drawing Sheets

(56) References Cited

U.S. PATENT DOCUMENTS

| | | | |
|---|---|---|---|
| 2009/0144039 A1* | 6/2009 | Thorsteinsson | G06F 30/15 |
| | | | 703/6 |
| 2015/0149135 A1* | 5/2015 | Tervo | G05B 17/02 |
| | | | 703/8 |
| 2015/0199471 A1 | 7/2015 | Thorsteinsson | |
| 2016/0042321 A1 | 2/2016 | Held | |
| 2021/0027225 A1* | 1/2021 | Mikalsen | B63B 79/40 |

* cited by examiner

DATA ACQUISITION APPARATUS AND METHOD

FIELD

The specification relates generally to data acquisition, and particularly to an apparatus and method of acquiring data from a vehicle.

BACKGROUND

United States Patent Application No. 2009/0144039 to Thorsteinsson ("Thorsteinsson") purports to disclose a method, computer program and system for optimizing the usage of energy sources on ships. Thorsteinsson purports to disclose that the method involves creating a computer simulation model of a ship, optimized for fuel efficiency. Thorsteinsson purports to disclose that creating the computer simulation model involves selecting equations from a pool of equations, describing core components and structural features of a ship, and data from a pool of characteristic data for the ship's core components and structures.

International Patent Application No. 2008/096376 to Thorsteinsson et al. ("Thorsteinsson et al.") purports to disclose a route selecting method and apparatus for a vehicle which makes use of information relating to environmental conditions across a geographical region which the vehicle must traverse, so as to select a route from a starting position within the geographical region to a destination position within the geographical region. Thorsteinsson et al. purports that, by taking into account characteristics of the vehicle with respect to external environmental parameters, a route can be plotted across the geographic region which, when considering actual and forecast environmental conditions across the region, minimises fuel usage, and thereby maximises energy efficiency.

SUMMARY

The following summary is intended to introduce the reader to various aspects of the applicant's teaching, but not to define any invention.

According to some aspects, there is provided a method of estimating an operational parameter of a subject vessel, comprising: receiving vessel data from a subject vessel, the vessel data including at least one actual data item of a set of possible data items that could be associated with the subject vessel; associating the vessel data with a vessel class, the subject vessel having one or more vessel parameters that fall within one or more parameter ranges of the vessel class; generating an estimated equivalent for at least one data item of the set of possible data items by processing the vessel data using a vehicle-class based machine learning model that is trained using a training data from vessels belonging to the same vehicle class of the subject vessel; and providing the estimated equivalent to a user, storing the estimated equivalent to a datastore and/or sending the estimated equivalent to a remote device.

In some embodiments, the vessel parameters include one or more of a vessel length of the subject vessel, an engine size of the subject vessel, and/or a weather system associated with a time and a location at which the vessel data was collected.

In some embodiments, the set of possible data items includes the actual fuel flow, the actual speed through water, the actual speed over land, the actual direction, the actual weather conditions, the actual vessel motion, the actual torque output, the actual drive shaft revolutions per minute, the actual vessel power, and/or the actual emission output.

In some embodiments, the vessel data includes actual speed through water and at least one of actual fuel flow, actual speed over land, actual direction, actual weather conditions, actual vessel motion, actual torque output, actual drive shaft revolutions per minute, actual vessel power, and actual emission output of the subject vessel.

In some embodiments, the vessel data does not include the at least one data item of the set of possible data items that the vehicle-class based machine learning model is adapted to generate the estimated equivalent of, such that the estimated equivalent may be used in the place of the at least one data item of a set of possible data items.

In some embodiments, the vessel data does not include the actual torque output, the actual drive shaft revolutions per minute, and the actual vessel power, and the estimated equivalent includes an estimation of at least one of the actual torque output, the actual drive shaft revolutions per minute, and the actual vessel power.

In some embodiments, the training data includes torque data.

In some embodiments, the vessel data is missing the actual torque output, and the vehicle-class based machine learning model is adapted to generate the estimated equivalent to include an estimation of the actual torque output.

In some embodiments, the vessel data does not include actual emission output, and the estimated equivalent includes an estimation of the actual emission output.

In some embodiments, the database used to train the machine learning model included emission data from the vessels of the class of the subject vessel.

In some embodiments, the method further comprises associating the estimation of the actual emission output with a product or service.

In some embodiments, the method further comprises: comparing the estimated equivalent to a corresponding actual data item of the vessel data to generate a difference between the actual data item and the estimated equivalent; and generating an alert when the difference is greater than or lesser than a threshold or outside a range of acceptable values.

In some embodiments, the alert includes a remediation suggestion.

In some embodiments, the remediation suggestion includes inspecting a propeller or inspecting a filter.

In some embodiments, the alert is a maintenance warning and suggests at least one operation system component for review, maintenance, repair, or replacement.

In some embodiments, the method further comprises receiving third-party weather data corresponding to a time and a location or a nearby time and nearby location at which the vessel data was recorded, and wherein generating the estimated equivalent also includes processing the third-party weather data using the vehicle-class based machine learning model.

In some embodiments, the third-party weather data is a weather forecast corresponding to the time and the location at which the vessel data was recorded.

In some embodiments, the third-party weather data is a weather estimate corresponding to the time and the location at which the vessel data was recorded, the weather estimate based on third-party weather data recorded at a nearby location and/or a nearby time.

In some embodiments, the vessel data is missing actual weather conditions, and the vehicle-class based machine learning model is adapted to generate the estimated equivalent to include an estimation of the actual weather conditions, the actual weather conditions including wave height data and windspeed data.

In some embodiments, the vessel data from the subject vessel is obtained by installing an after-market data acquisition unit on the vessel, communicatively coupling the data acquisition unit to at least one vessel system to receive the vessel data from the at least one vessel system, and sending the data to a remote data storage device using the data acquisition unit.

According to some aspects, there is provided a portable data acquisition unit, comprising: a portable housing; a local data storage device contained in the housing; a plurality of peripheral device couplings that are communicatively couplable to a plurality of peripheral devices including at least one operational system of the vessel and/or at least one sensor mounted to the vessel; a communications module operable to transmit to and receive data from a remote device; and a processor that is operatively coupled to the local data storage device, the plurality of peripheral device couplings and the communications module, the processor being configured to: (a) receive operational data and/or sensor data from at least one operational system of the vessel and/or the at least one sensor, respectively; and (b) store the operational data and/or sensor data on the local data storage device and/or transmit the operational data and/or sensor data via the communications module to the remote device.

In some embodiments, the data acquisition unit further comprises a power coupling operable to join the data acquisition unit to an external power supply to receive power from the external power supply.

In some embodiments, the at least one peripheral device couplings includes a coupling for a hydrophone.

In some embodiments, the portable data acquisition unit further comprises an inertial measurement unit contained in the portable housing and configured for measuring inertial measurement data and communicatively coupled to the processor for storage of the inertial measurement data to the data storage device.

According to some aspects, there is provided a system comprising: a subject vessel; and the portable data acquisition unit, the portable data acquisition unit being mounted on the subject vessel.

In some embodiments, the data acquisition unit is mounted on a centerline of the subject vessel.

In some embodiments, the system further comprises a hydrophone, wherein the hydrophone is configured to measure sound from the hull, propeller, and/or internal machinery of the subject vessel and is communicatively coupled to the peripheral device coupling to provide the sound as part of the sensor data.

In some embodiments, the system further comprises: a remote data storage device; and a processor communicatively coupled to the remote data storage device to access a database stored on the remote data storage device, wherein the database includes vessel data received from the portable data acquisition unit, the vessel data including at least one actual data item of a set of possible data items that could be associated with the subject vessel, and wherein the processor is operable to: associate the vessel data with a vessel class, the subject vessel having one or more vessel parameters that fall within one or more parameter ranges of the vessel class, and generate an estimated equivalent for at least one data item of the set of possible data items by processing the vessel data using a machine learning model, the machine learning model trained using a database of data from vessels of the class of the subject vessel.

In some embodiments, the vessel parameters include one or more of a vessel length of the subject vessel, an engine size of the subject vessel, and/or a weather system associated with a time and a location at which the vessel data was collected.

In some embodiments, the database includes at least two actual data items of the set of possible data items, the set of possible data items including actual fuel flow, actual speed through water, actual speed over land, actual direction, actual weather conditions, actual vessel motion, actual torque output, actual drive shaft revolutions per minute, actual vessel power, and actual emission output of the subject vessel.

In some embodiments, the database includes actual speed through water and at least one of actual fuel flow, actual speed over land, actual direction, actual weather conditions, actual vessel motion, actual torque output, actual drive shaft revolutions per minute, actual vessel power, and actual emission output of the subject vessel.

According to some aspects, there is provided a method, wherein the method comprises: receiving data from a subject vessel over a period of time, the data including hydrophone data; detecting an abnormality in the hydrophone data; associating the abnormality with an operational system component of the subject vessel; and generating a maintenance alert identifying the operational system component needs further attention.

In some embodiments, the hydrophone data is generated by a hydrophone configured to measure sound from at least one component selected from the group of a hull, a propeller, an engine, gearing, a motor, or a bearing of the vessel.

In some embodiments, the method further comprises processing the hydrophone data to remove at least one frequency band.

In some embodiments, the at least one frequency band is associated with voices.

In some embodiments, the at least one frequency band is associated with non-vessel equipment.

In some embodiments, the data further includes fuel flow data, and detecting the abnormality in the hydrophone data includes detecting the abnormality in the hydrophone data in view of the fuel flow data.

In some embodiments, the method further comprises associating the data with a vehicle class based on a vessel length of the subject vessel, an engine size of the subject vessel, and/or a weather system associated with a time and a location at which the vessel data was collected, and wherein detecting the abnormality in the hydrophone data includes processing the hydrophone data using a vehicle-class based machine learning model that is trained using training data from vessels of the same vehicle class as the subject vessel.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 4 is a schematic diagram showing the sensors that the data acquisition unit of FIG. 2 may be interfaced with;

DETAILED DESCRIPTION

Figure 1:
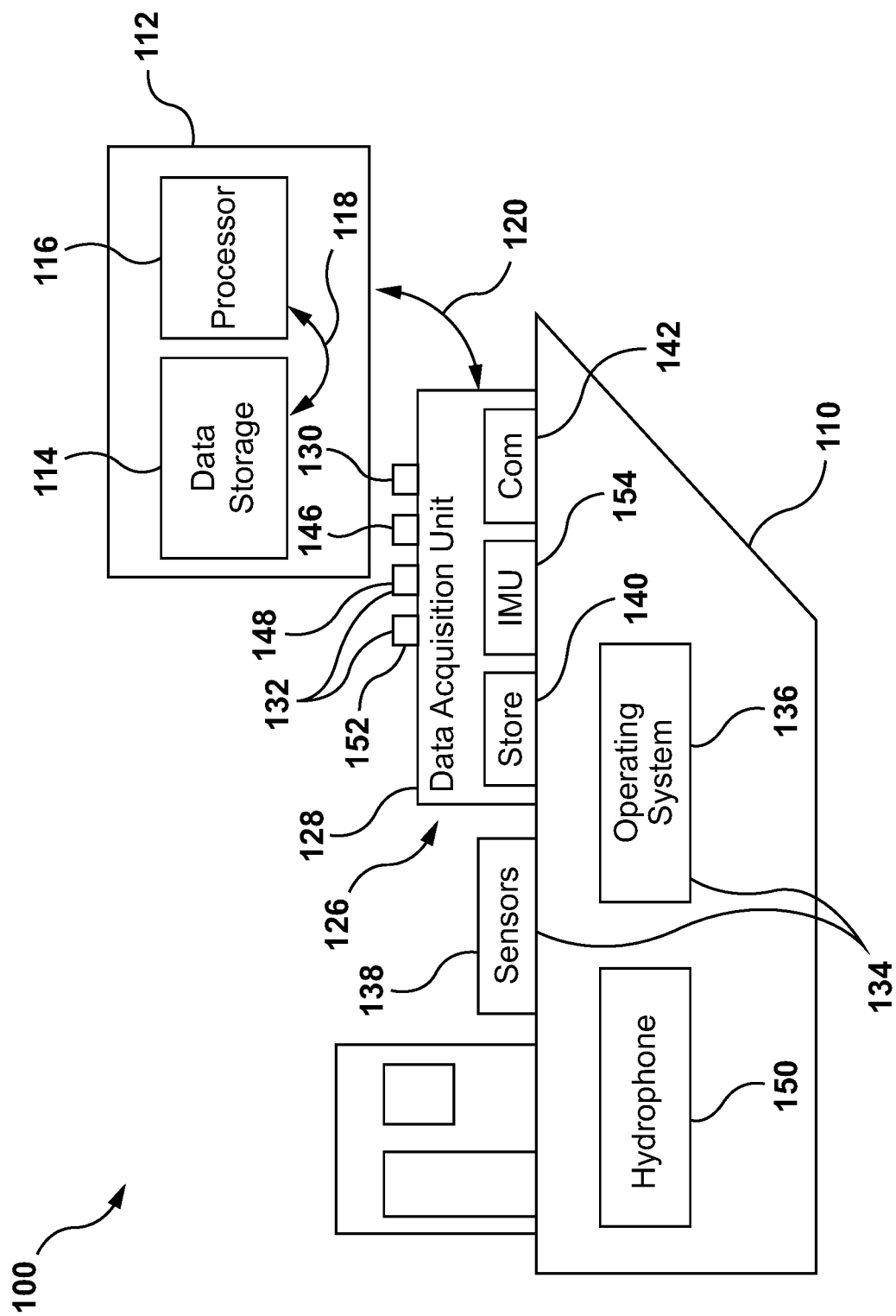
FIG. 1 is a schematic diagram of an example embodiment of a system for analysing marine data.
Figure 2:
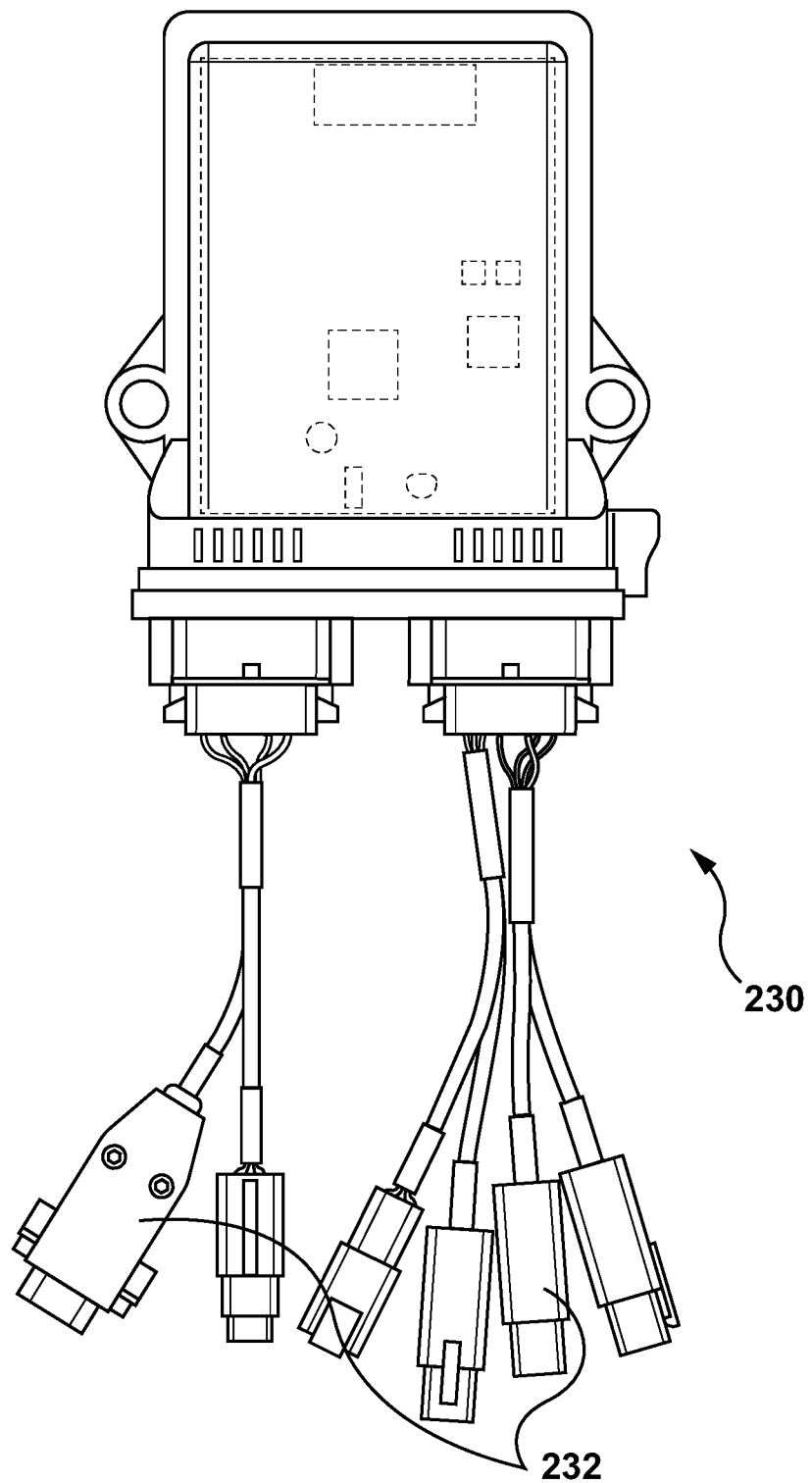
FIG. 2 is a top view of an example embodiment of a data acquisition unit.
Figure 3:
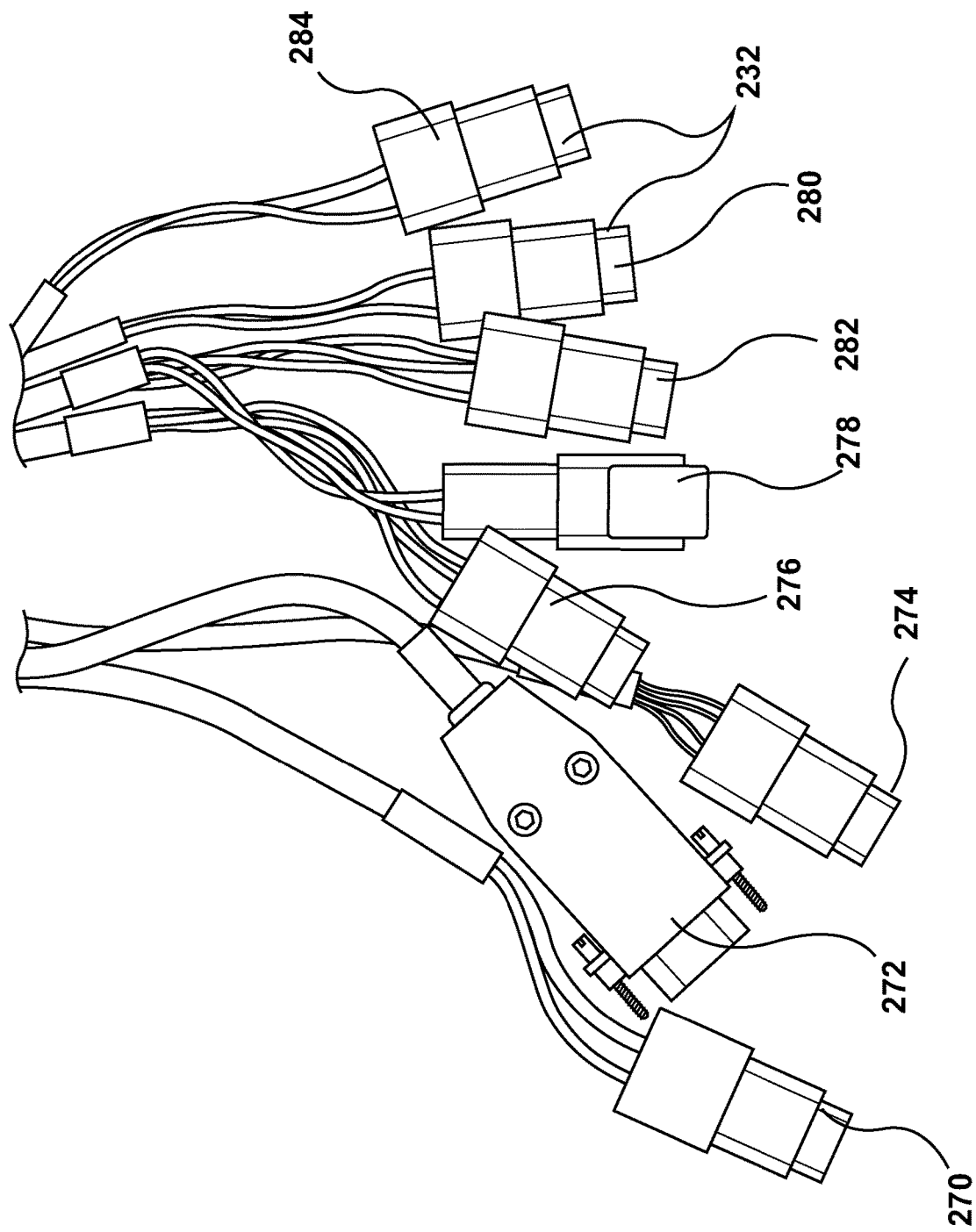
FIG. 3 is a top view of a plurality of peripheral device couplings of the data acquisition unit of FIG. 2.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses or process described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending on the context in which these terms are used. For example, the terms coupled or coupling can have a mechanical, electrical or communicative connotation. For example, as used herein, the terms coupled or coupling can indicate that two elements or devices can be directly connected to one another or connected to one another through one or more intermediate elements or devices via an electrical element, an electrical signal or a mechanical element depending on the particular context.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

Reference throughout this specification to "one embodiment", "an embodiment", "at least one embodiment" or "some embodiments" means that one or more particular features, structures, or characteristics may be combined in any suitable manner in one or more embodiments, unless otherwise specified to be not combinable or to be alternative options. Accordingly, the definitions and embodiments described in particular sections are intended to be applicable to other embodiments herein described for which they are suitable as would be understood by a person skilled in the art.

Similarly, throughout this specification and the appended claims the term "communicative" as in "communicative pathway," "communicative coupling," and in variants such as "communicatively coupled," is generally used to refer to any engineered arrangement for transferring and/or exchanging information. Examples of communicative pathways include, but are not limited to, electrically conductive pathways (e.g., electrically conductive wires, physiological signal conduction), electromagnetically radiative pathways (e.g., radio waves), or any combination thereof. Examples of communicative couplings include, but are not limited to, electrical couplings, magnetic couplings, radio couplings, or any combination thereof.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect" "to, at least, provide," "to, at least, transmit," and so on.

A portion of the example embodiments of the methods, systems, or devices described in accordance with the teachings herein may be implemented as a combination of hardware or software. For example, a portion of the embodiments described herein may be implemented, at least in part, by using one or more computer programs, executing on one or more programmable devices comprising at least one processing element, and at least one data storage element (including volatile memory, non-volatile memory and/or at least one storage device). These devices may also have at least one input element (e.g., a keyboard, a mouse, a touchscreen, and the like) and at least one output element (e.g., a display screen, a printer, a wireless radio, and the like) depending on the nature of the device. For example, and without limitation, the device may be a programmable logic unit, a mainframe computer, server, and personal computer, cloud based program or system, laptop, personal data assistance, cellular telephone, smartphone, or tablet device.

It should also be noted that there may be some elements that are used to implement at least part of the embodiments described herein that may be implemented via software that is written in a high-level procedural language such as object-oriented programming. The program code may be written in C, C++ or any other suitable programming language and may comprise modules or classes, as is known to those skilled in object-oriented programming. Alternatively, or in addition thereto, some of these elements implemented via software may be written in assembly language, machine language, or firmware as needed.

At least some of the software programs used to implement at least one of the embodiments described herein may be stored on a storage media or a device that is readable by a programmable device. The software program code, when read by the programmable device, configures the programmable device to operate in a new, specific and predefined manner in order to perform at least one of the methods described herein.

Furthermore, at least some of the programs associated with the embodiments described herein may be capable of being distributed in a computer program product comprising a computer readable medium that bears computer usable instructions, such as program code, for one or more processors. The program code may be preinstalled and embedded during manufacture and/or may be later installed as an update for an already deployed computing system. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g., downloads), media, digital and analog signals, and the like. The computer useable instructions may also be in various formats, including compiled and non-compiled code.

Accordingly, any module, unit, component, server, computer, terminal or device described herein that executes software instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of the device or accessible or connectable thereto.

Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be described in the examples herein. Any method, software application or software module herein described may be implemented using computer readable/executable instructions that may be stored or otherwise held by such computer readable media and executed by the one or more processors.

It should also be noted that a description of an embodiment with several components in communication with each other does not imply that all such components are required. On the contrary a variety of optional components are described to illustrate the wide variety of possible embodiments in accordance with the teachings herein.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously depending on the situation.

In addition, in some cases, when a single device or article is described herein, it will be readily apparent that more than one device/article (whether or not they cooperate) may be used in place of a single device/article. Similarly, in some cases where more than one device or article is described herein (whether or not they cooperate), it will be readily apparent that a single device/article may be used in place of the more than one device or article.

Referring to FIG. 1, illustrated therein is a system 100 for analysing marine data. The system 100 is operatively coupled to a marine vessel 110 (also referred to a boat) and a remote server 112. While the illustrated system 100 is operable with a single marine vessel 110 and a single remote server 112, in some embodiments there are a plurality of marine vessels 110 and/or a plurality of remote servers 112.

While this description refers to marine vehicles (e.g., boats and marine vessels), it will be appreciated that the system may be used with suitable non-marine vehicle(s) in addition to or as an alternative to marine vehicle(s). In particular, the system may be used with land-based vehicles (e.g., automobiles such as cars or trucks) in addition to or as an alternative to marine vehicles. For example, the system may be used with electric vehicles, e.g., to help electric vehicles choose routes using Artificial Intelligence (AI) as described further below with respect to marine vehicles.

The remote server 112 typically includes a data storage device 114 and a processer 116. While the illustrated remote server 112 includes a single data storage device 114 and a single processor 116, in some example embodiments there may be a plurality of data storage devices 114 and/or a plurality of processors 116. In at least one embodiment, the data storage device 114 may be remote from the processor 116.

In general, the processor 116 is communicatively coupled to the data storage device 114 to retrieve information stored on the data storage device 114 and/or provide information to the data storage device 114 for storage. The processor 116 may also access program instructions that are stored on the data storage device 114 which, when executed by the processor 116, configures the processor 116 to perform one or more functions in accordance with the teachings herein. As exemplified, the processor 116 is communicatively coupled to the data storage device 114 via a connection 118. The connection 118 may be wired and/or wireless. While the illustrated server 113 includes a single connection 118, in some embodiments there may be a plurality of such connections 118.

The remote server 112 is configured to receive vessel data from the marine vessel 110. The remote server 112 (e.g., the processor 116) is communicatively coupled to the marine vessel 110 and/or an on-board device to receive the vessel data and/or provide information (e.g., analysis results) to the marine vessel 110 and/or the on-board device (e.g., data acquisition device). The remote server 112 is communicatively coupled to the marine vessel 110 and/or the on-board device via a connection 120. The connection 120 may be wired and/or wireless. While the illustrated system 100 includes a single connection 120, in some example embodiments there may be a plurality of connections 120.

The marine vessel 110 may be, but is not limited to, a fishing boat, a cruise ship, or a tour boat, for example. In some example embodiments, the marine vessel 110 is a small vessel. In some example embodiments, the marine vessel 110 is less than 50 meters long, less than 25 meters long, or less than 15 meters long. A small vessel may have fewer onboard data gathering systems, data aggregating systems, data analysis systems and/or data presentation systems. In the illustrated example, a data acquisition unit 126 is located in the marine vessel 110. The data acquisition unit 126 is an on-board device, and the remote server 112 is communicatively coupled to the data acquisition unit 126.

The system 100 may use various data acquisition units, as described further below. For instance, in some example embodiments the data acquisition unit 126 is a user mobile device (e.g., a smartphone) with built-in sensors (e.g., an IMU, a temperature sensor, and/or a pressure sensor) but without peripheral device couplings (e.g., data communication ports) for coupling the data acquisition unit to external devices. Where a data acquisition unit does not include peripheral device couplings, the system 100 may rely more heavily upon estimated equivalents for missing data when providing data to a user, as described further below.

In some example embodiments, such as that shown in FIG. 1, the data acquisition unit 126 is an after-market unit that is used with the marine vessel 110. In some example embodiments, the data acquisition unit 126 is a portable unit. In some example embodiments, the data acquisition unit 126 is a single self-contained unit. In such embodiments, the data acquisition unit 126 generally includes a housing 128, with constituent parts mounted to, through, or within the housing 128.

The size of the data acquisition unit 126 is exaggerated for clarity. In some example embodiments, the data acquisition unit 126 is a small device. For example, the data acquisition unit 126 may weigh less than about 20 kg, 10 kg, 5 kg, or 1 kg. In some example embodiments, the data acquisition unit 126 has a physical footprint (e.g., taking up deck space) that is less than 1 square meter, ⅕ square meter, 0.1 square meter, or 0.01 square meter.

In some example embodiments, the data acquisition unit 126 is powered by an external device. In some example embodiments, the data acquisition unit 126 is powered by the marine vessel with which it is installed. In some example embodiments, the data acquisition unit 126 includes a power coupling 130 operable to provide an electrical connection for the data acquisition unit 126 to an external power supply to receive power from the external power supply. The external power supply may be, e.g., a battery or a power distribution system of the marine vessel 110.

In the illustrated example, the data acquisition unit 126 includes a plurality of peripheral device couplings 132 which are each operable be coupled to a peripheral device 134 to receive data from the peripheral device 134. The device coupling 132 is coupled to the peripheral device 134 via a wired and/or wireless connection (e.g., a cable or a Bluetooth™ connection). Each device coupling 132 is coupled to the peripheral device 134 via a single connection or a plurality of connections.

The illustrated peripheral devices 134 include an integrated system 136 of the marine vessel 110 (e.g., a propeller drive system or other electrical system of the marine vessel 110) and/or one or more sensors 138 (e.g., a fuel flow meter, wind speed sensor, and/or hydrophone) mounted to the marine vessel 110. While a single integrated system 136 and a single sensor 138 are illustrated, in some example embodiments the marine vessel 110 includes a plurality of integrated systems 136 and/or a plurality of sensors 138.

The data acquisition unit 126 includes a data storage device 140 and a communications module 142 (e.g., including a cellular, satellite, or Internet transceiver). While a single storage device 140 and a single communications module 142 are illustrated, in some example embodiments the data acquisition unit 126 includes a plurality of storage devices 140 and/or a plurality of communications modules 142. The storage device 140 is provided to store vessel data in a permanent or temporary fashion, e.g., to store data until the data acquisition unit 120 can be communicatively coupled to the remote server 112.

The communications module 142 is communicatively coupled to the data storage device 140 to send and/or received information (e.g., the vessel data) from the storage device 140.

The communications module 142 is operable to send data to the remote server 112 and receive data from the remote server 112. The communications module 142 is operable to send data from the storage device 140 to the remove server 112 when the data transfer network or connection 120 (e.g., cellular, satellite, and/or Wi-Fi™) is available. For example, the connection 120 may be unavailable if the vessel 110 is far out to sea, or in poor weather (e.g., a storm). Data is stored the data storage unit 140, e.g., at least as a backup, until the communication connection 120 is available again.

Each peripheral device coupling 132 is operable to communicatively couple the data storage device 140 to a peripheral device to receive information from the peripheral device. The vessel data of the subject vessel 112 includes the information received from the plurality of peripheral devices. In the illustrated example, a first coupling 146 of the peripheral device couplings 132 is operable to be coupled to the illustrated operational system 136 of the vessel 110 to transfer operational data from the operational system 136 to the local data storage device 140 and a second coupling 148 of the peripheral device couplings 132 is operable to be coupled to the sensor 138 to transfer sensor data from the sensor 138 to the local data storage device 140. The communications module 142 is communicatively coupled to the local data storage device 140 and operable to transmit the vessel data to the remote data storage device 114 (e.g., via the processor 116) to be stored in a database or other data storage structure(s) at the remote data storage device 114.

In some example embodiments, one of the sensors 138 of the peripheral devices include a hydrophone 150 and the peripheral device couplings 132 include a coupling 152 for the hydrophone 150. The hydrophone 150 may be used to collect sound from the hull and/or other components of the vessel 110. In some example embodiments, the hydrophone 150 is configured to measure sound from the hull, propeller, and/or internal machinery of the subject vessel and the resulting sound data is communicatively coupled to the peripheral device coupling 152 to provide the sound data as part of the sensor data to be included in the vessel data, which may then be stored in the database on the server 112. The inventors have discovered that sound, and particularly changes in sound generated by the vessel 110, may be used to detect issues with the vessel 110 (e.g., mechanical problems) and/or underwater noise pollution generated by the vessel 110. For example, underwater sound data may be used to generate comparison data that results from comparing the amount of noise pollution generated by different operating modes of the vessel 110 and/or comparing the amount of noise pollution generated by different drive systems (e.g., electric versus diesel). The comparison data may then be stored in the database and/or presented to a user.

In some example embodiments, the data acquisition unit 126 includes an inertial measurement unit 154 ("IMU"). The IMU 154 is contained in the portable housing 128 and communicatively coupled to the data storage device 140 to provide inertial measurement data to the data storage device 140. In some example embodiments, the IMU 154 (e.g., 3 or more axis IMU) is integrated with a motherboard of the data acquisition unit 126. The IMU 154 may be used to detect movement of the vessel 110. The inventors have discovered that including the IMU 154 in the housing 128 of the data acquisition unit 126 allows for accurate movement data of the movement of the vessel 110 to be recorded. In some example embodiments, the data acquisition unit 126 is mounted on the centerline of the marine vessel 110 (i.e., equally distant from each of the lateral sides), which may provide more accurate readings from the integrated IMU 154.

In some example embodiments, the data acquisition unit 126 includes a temperature sensor and/or an air pressure sensor. In some embodiments, the temperature sensor and/or the air pressure sensor is contained in the portable housing 128 and communicatively coupled to the data storage device 140 to provide temperature and/or pressure data, respectively, to the data storage device 140. In some example embodiments, the temperature sensor and/or the air pressure sensor is integrated with a motherboard of the data acquisition unit 126.

In some example embodiments, the system 100 is operable to gather vessel data that includes, but is not limited to, vessel location, vessel orientation, vessel speed, vessel heading, vessel power, vessel fuel usage, and/or weather conditions (e.g., wind speed and direction) at the vessel 110. In some example embodiments, the system 100 is also operable to gather information on the range left for the vessel 110 to travel due to current battery charge level for battery electric hybrid drive systems, the vessel location (e.g., plotted on a map or given as coordinates), and overall estimated gas emissions from the vessel 110 during a particular journey. In some example embodiments, the system 100 is operable to gather weather information such as, but not limited to, wind speed, air temperature and/or wave height of the surrounding sea state. In some example embodiments, the vessel data is provided to the server 112 in real time or near real time. When no connection to the server 112 is available, data may be stored locally until a connection is available.

Referring now to FIGS. 2-8, illustrated therein is an example embodiment of a data acquisition unit 226. Data acquisition unit 226 is similar in some respects to data acquisition unit 126, and similar features are indicated with similar reference numbers, incremented by 100.

Figure 4:
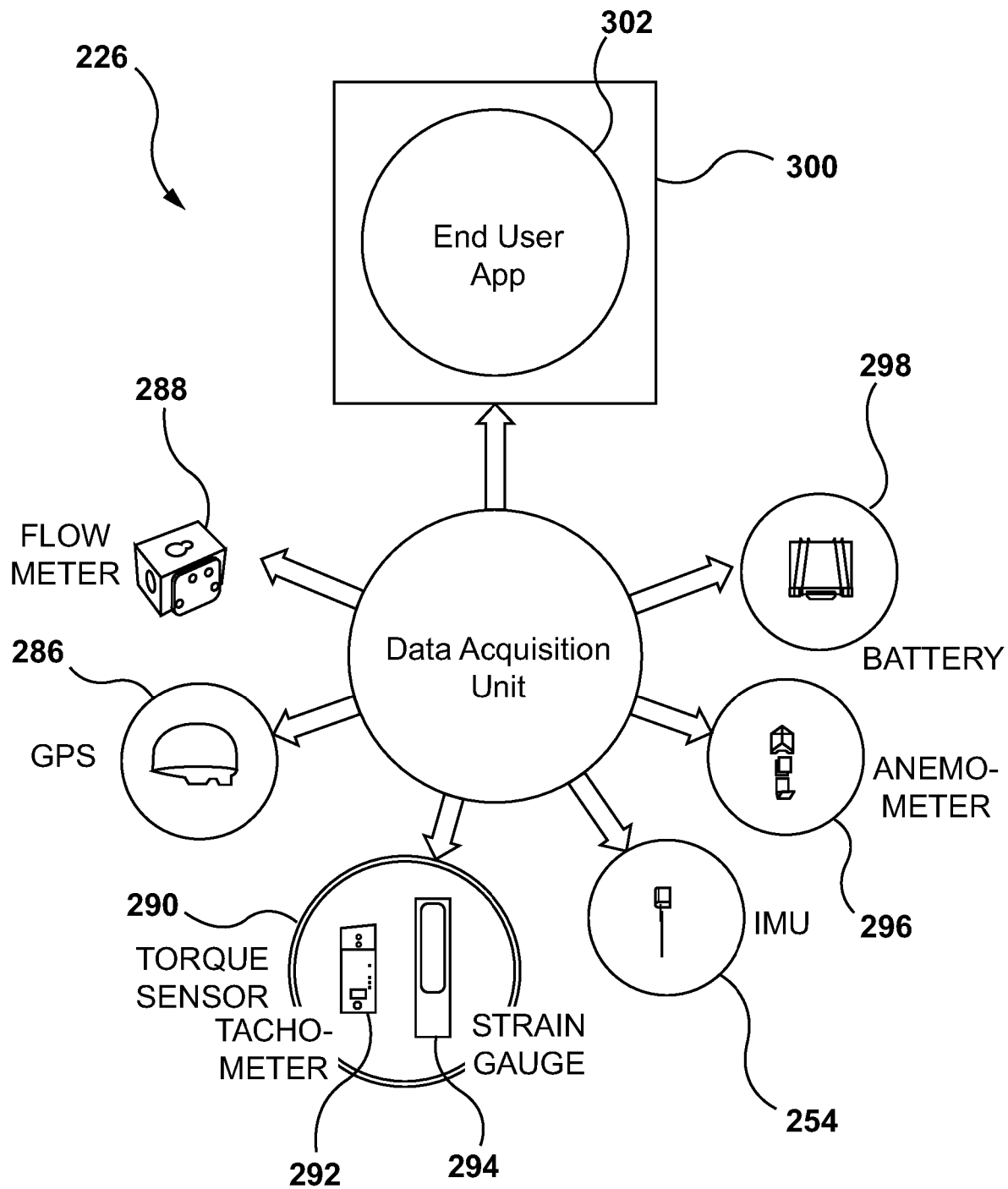

The data acquisition unit 226 includes a plurality of peripheral device couplings 232 extending from the housing 228. As illustrated particularly in FIG. 3, the peripheral device couplings 232 include a coupling 270 for a GPS device, a coupling 272 for a torque sensor, a coupling 274 for an external inertial measurement unit, a coupling 276 for an anemometer (i.e., to gather wind speed and/or direction), a coupling 278 for a power source, a coupling 280 for a user terminal or interface for use in controlling the data acquisition system, a first coupling 282 for a fuel flow sensor, and a second coupling 284 for a second fuel flow sensor. As illustrated in FIG. 4, the data acquisition unit 226 includes and/or is coupled to a GPS system 286, a flow meter 288, a torque sensor 290 (including a tachometer 292 and a strain gauge 294), an IMU 254, an anemometer 296 (e.g., a 2-axis wind sensor with no moving parts operable to sample wind speed and direction data), a battery 298, and, via a communications module, a remote system 300 (e.g., server 112). The remote system 300 (e.g., device such as a smartphone) may generate an end user application 302 (e.g., a web application or a mobile application) for providing the data and/or an estimated equivalent. It should be noted that in alternative embodiments, some of the couplings and sensors shown in FIGS. 3 and 4 respectively may not be included.

Figure 5:
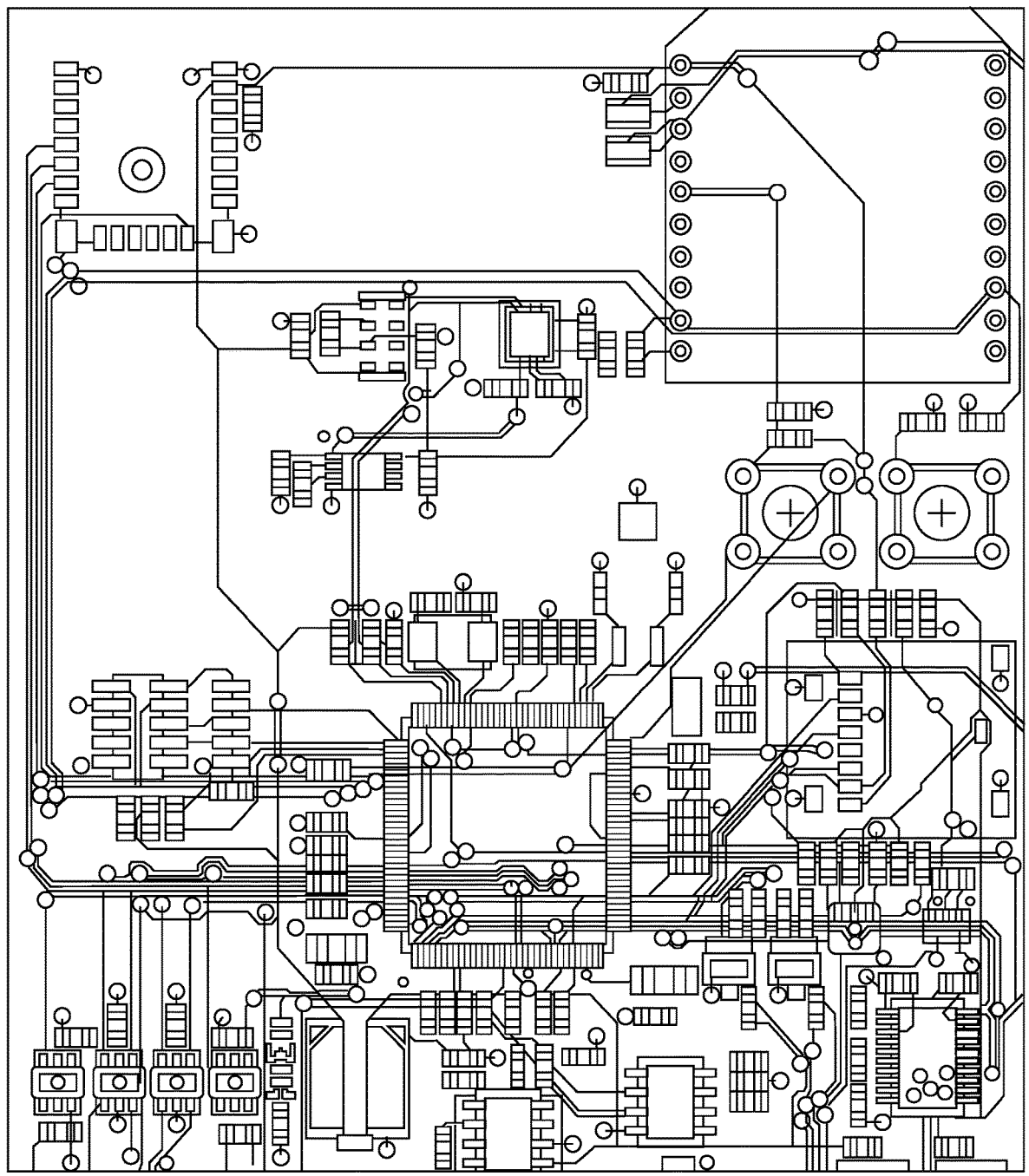
FIG. 5 is a top view of an example embodiment of a motherboard of the data acquisition unit of FIG. 2.

Referring now to FIG. 5, illustrated therein is a circuit board layout of the data acquisition unit 226.

Figure 6:
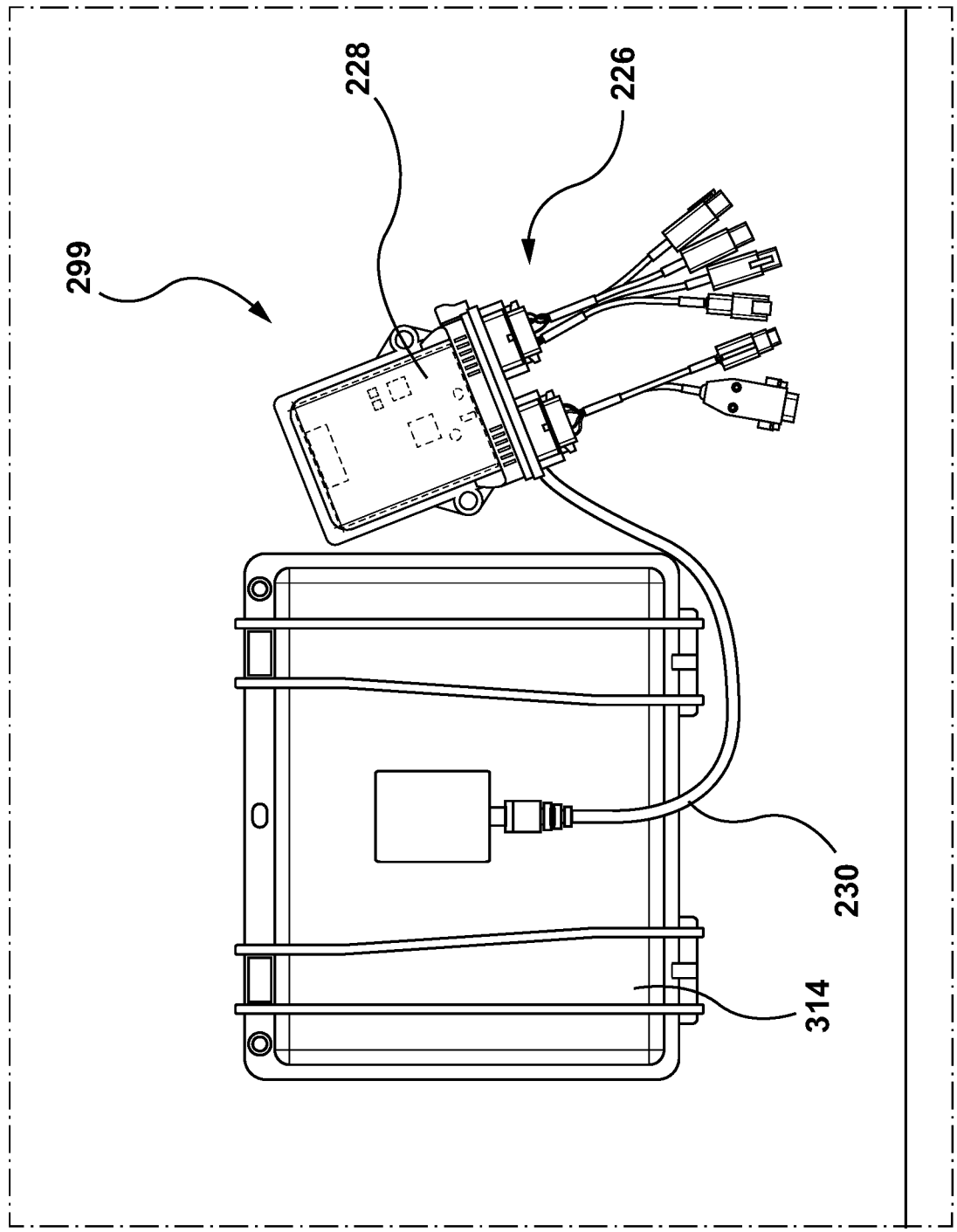
FIG. 6 is a top perspective view of the data acquisition unit of FIG. 2 coupled to a battery system.
Figure 7:
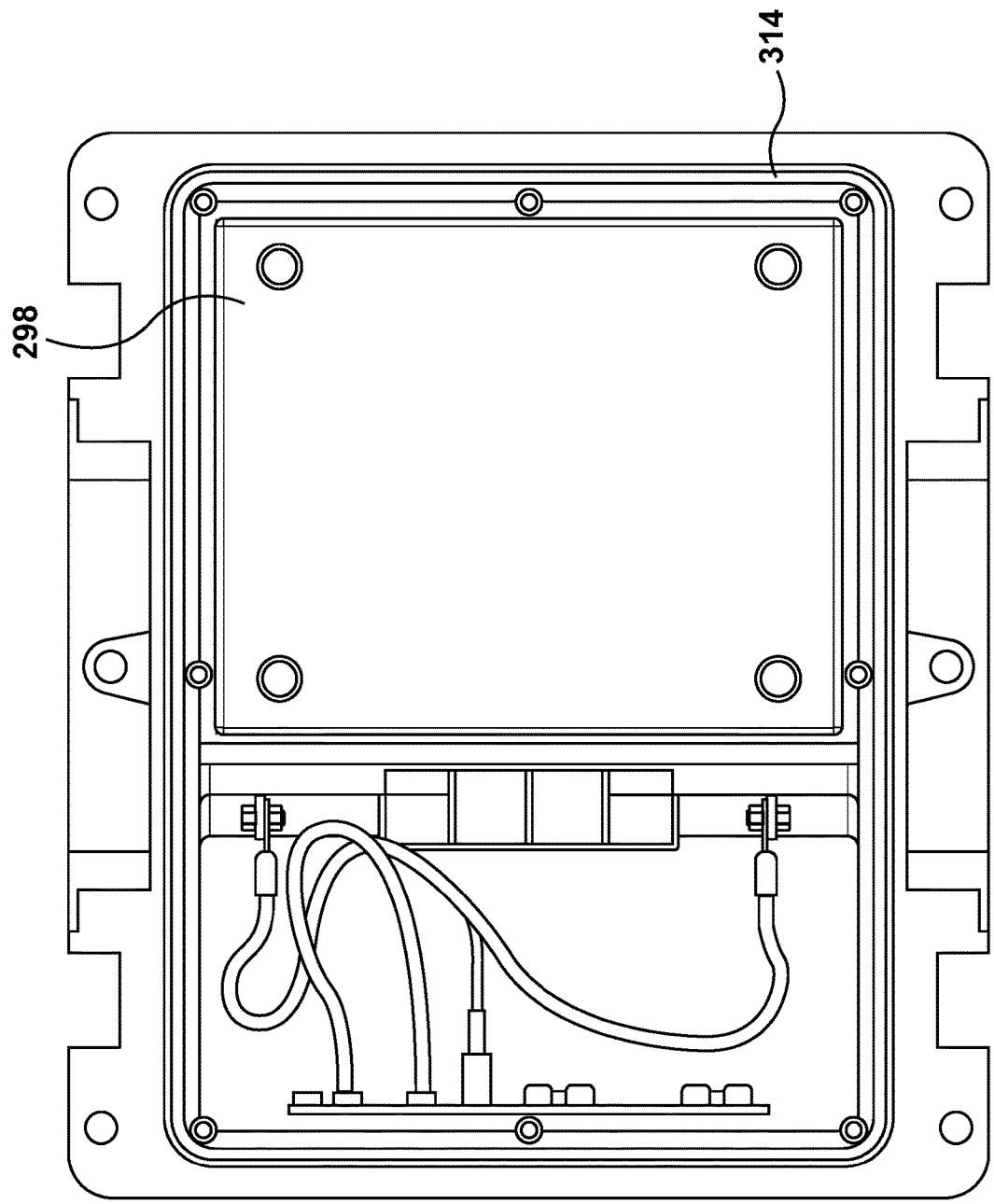
FIG. 7 is a top view of the interior of a battery housing of the battery system of FIG. 6.
Figure 8:
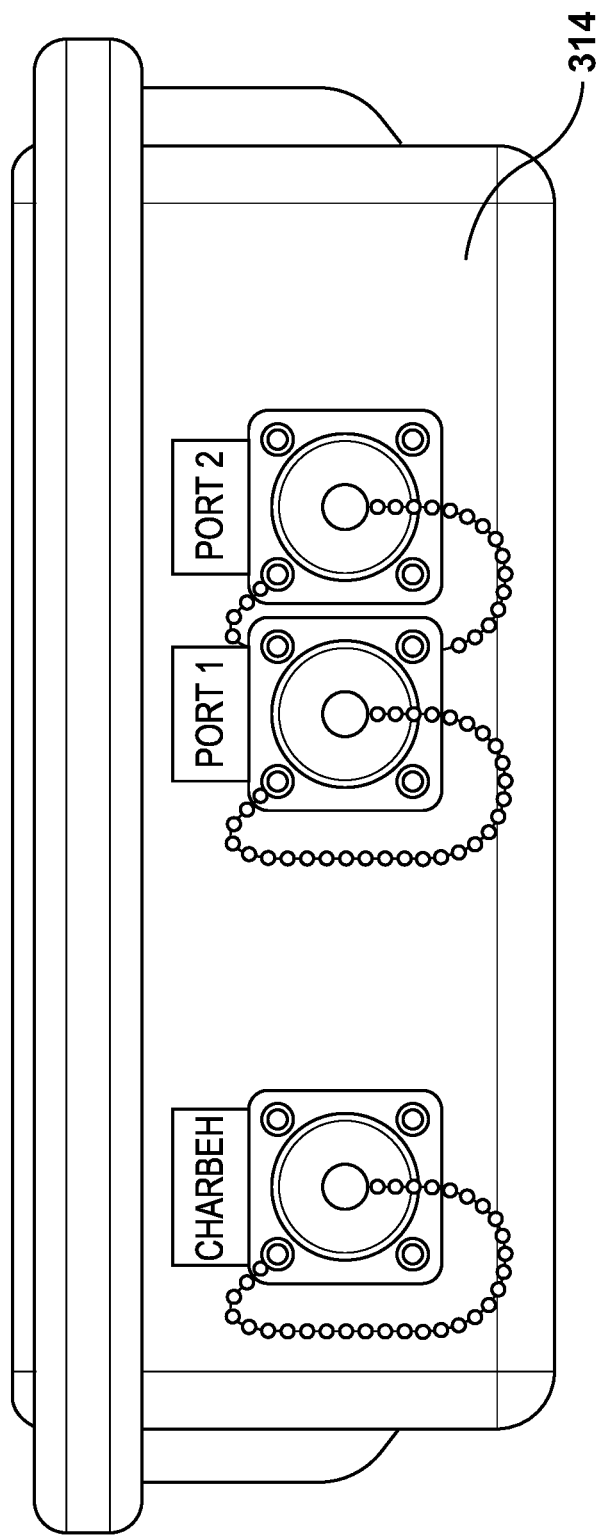
FIG. 8 is a front view of the battery housing of the battery system of FIG. 6.

As exemplified in FIGS. 6-8, the data acquisition unit 226 may be provided as a data acquisition system 299 along with the battery 298. The exemplary battery 298 is provided in a housing 314 and coupled to the data acquisition unit 226 via power coupling 230 to provide power to the data acquisition unit 226.

Figure 9:
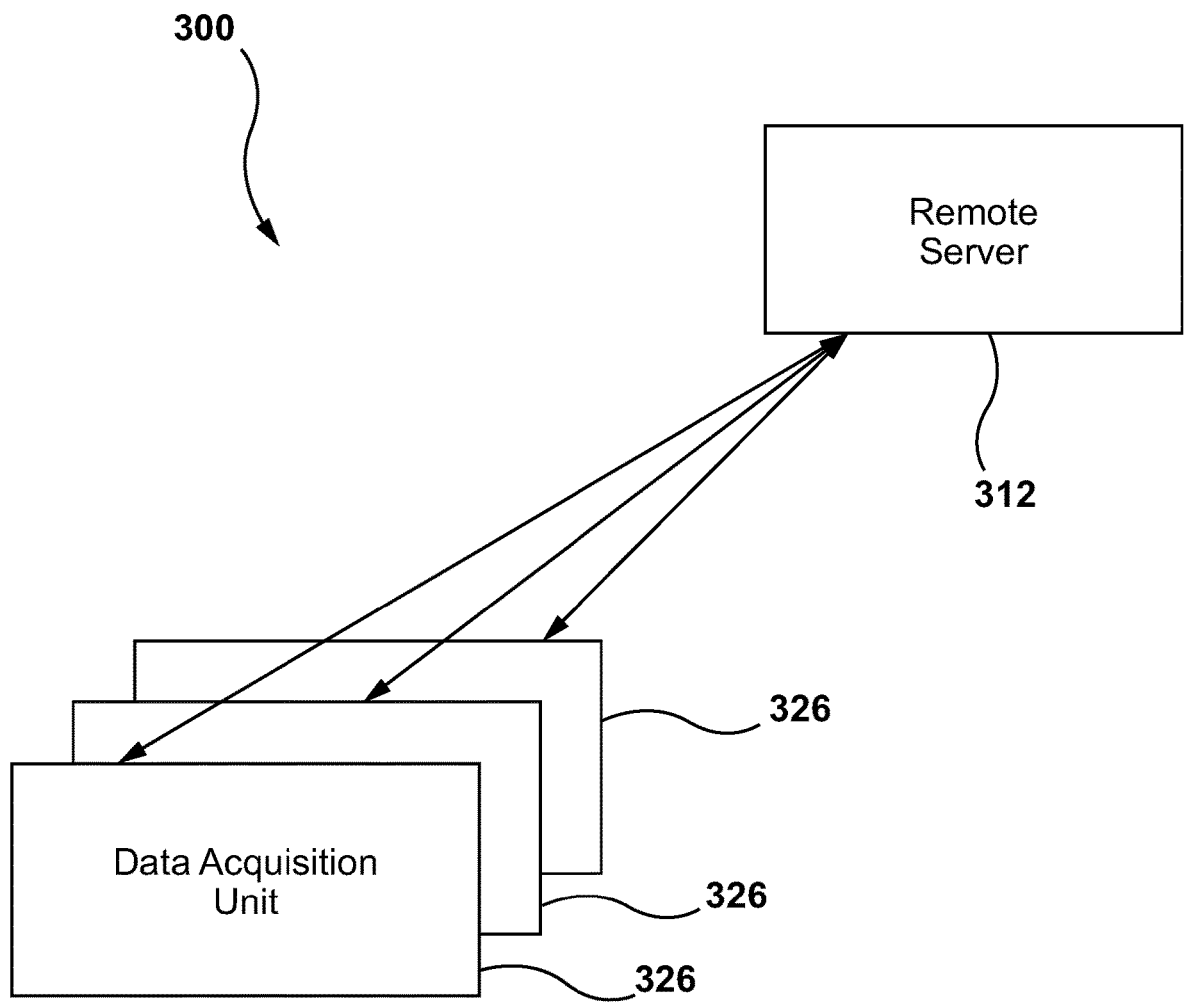
FIG. 9 is a schematic diagram of another example embodiment of a system for analysing marine data.
Figure 10:
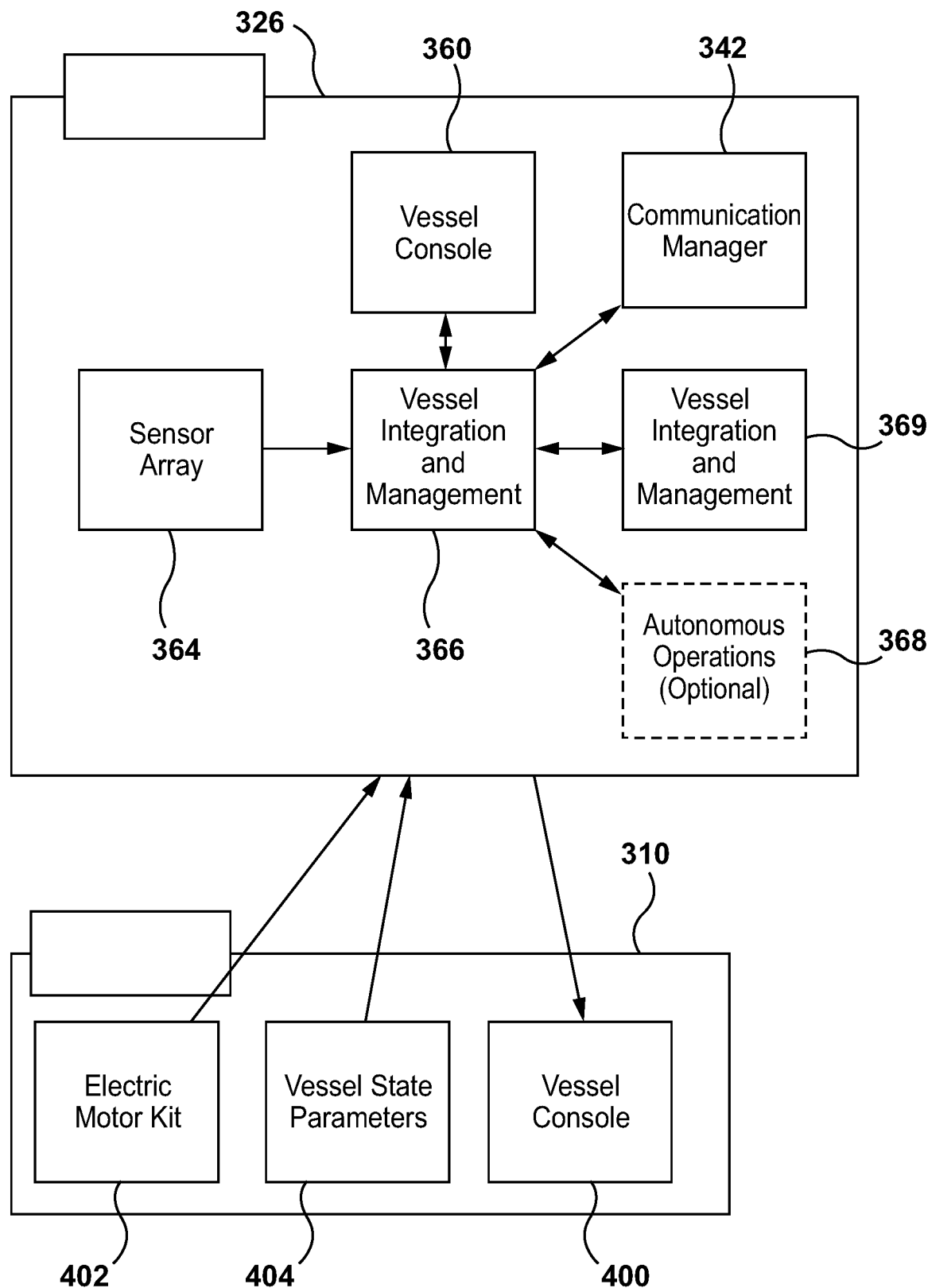
FIG. 10 is a schematic diagram of a first portion of the system of FIG. 9.
Figure 11:
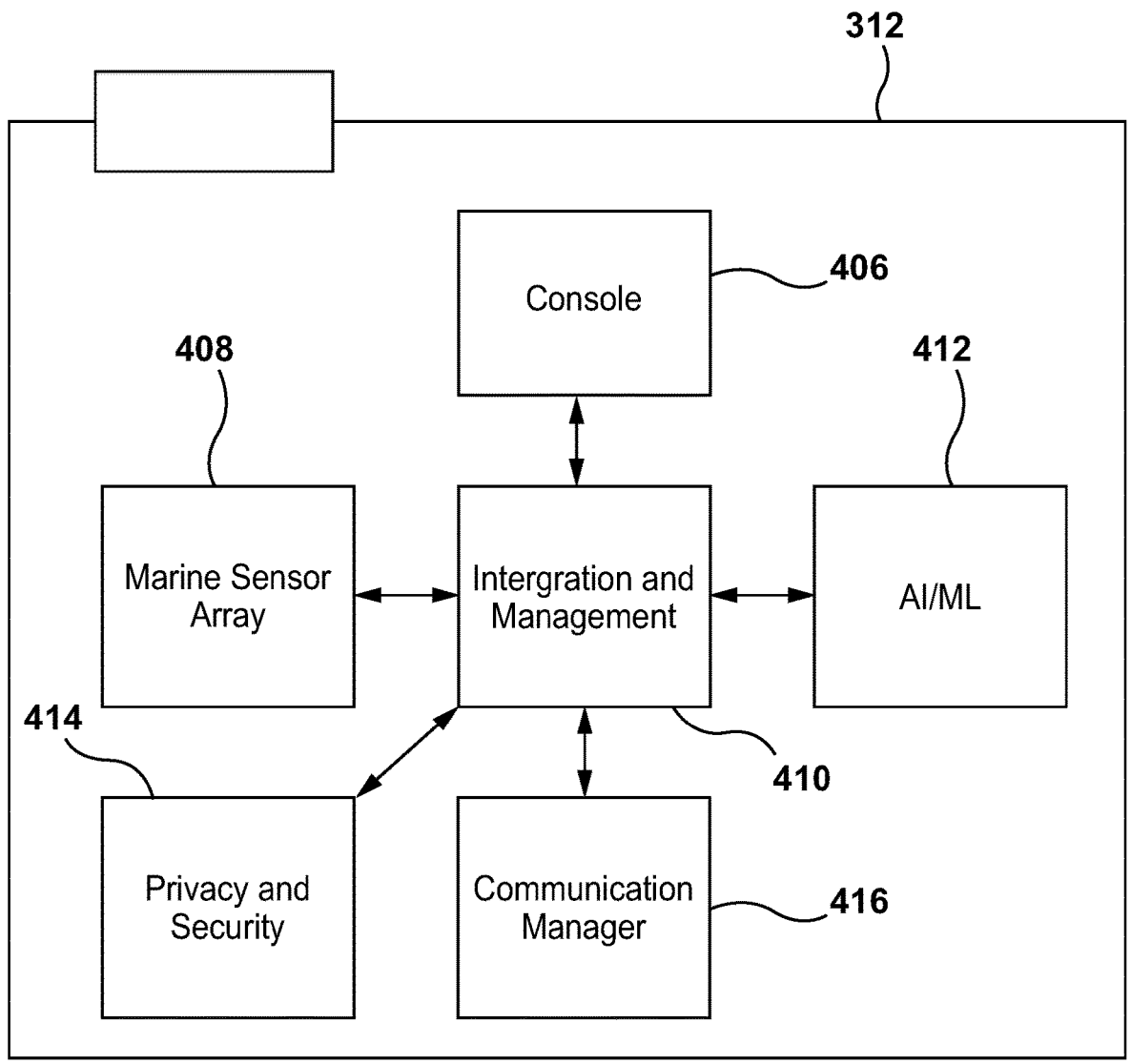
FIG. 11 is a schematic diagram of a second portion of the system of FIG. 9.

Referring now to FIGS. 9-11, illustrated is an alternative embodiment of a system 300 for analysing marine data. System 300 is similar in some respects to system 100, and similar features are indicated by similar reference characters, incremented by 200.

System 300 includes a vessel-mounted data acquisition unit 326 and a remote server 312. The vessel-mounted data acquisition unit 326 and the remote server 312 are communicatively coupled to each other. As illustrated in FIG. 10, the exemplary data acquisition unit 326 is communicatively coupled to integrated vessel systems on vessel 310. The data acquisition unit 326 includes a console 360, a communications manager 342, a sensor array 364, a vessel integration and management module 366, an autonomous operations module 368 (which may be optional), and a vessel privacy and security module 369.

The console 360 (e.g., physical device such as a tablet or smartphone or computer screen) is the vessel operator's interface with the vessel 310 and allows for access to and/or display of various type of vessel data and environmental data about the surroundings of the vessel 310 as well as the ability to analyze the vessel and/or environmental data. The console 260 may also provide the vessel operator with access to relevant operational information such as, but not limited to, the condition and status of various components of the vessel 310, monitoring alerts, sensor array status information, a navigation assistant, status of integration with additional components or modules such as the autopilot, and status of communication connections. The system 300 may use smart mobile technology for notifications. The console 360 may be part of the data acquisition unit or may be provided as part of a separate device.

The console 360 is supported by (e.g., provides visualizations for and allows control of) a web and/or mobile application that collects data from the data acquisition unit 326 (e.g., the data acquisition unit 126 or a mobile device such as a smartphone if the unit 126 is not available).

Figure 12:
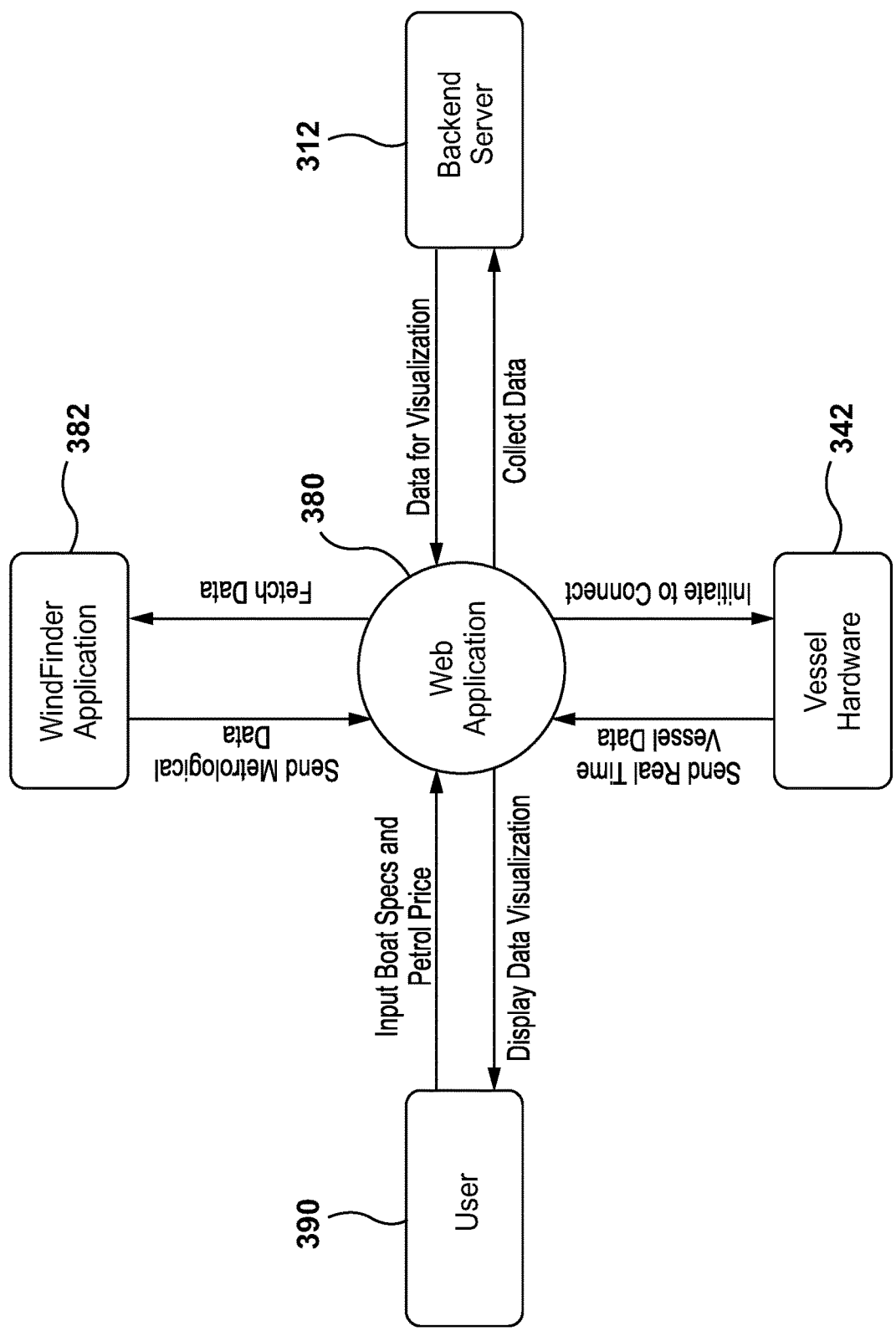
FIG. 12 is a schematic diagram of an application routing data in the system of FIG. 9.

Referring to FIG. 12, the web and/or mobile application 380 collects data from different sensors on the vessel and sends the data to the remote server 312. As exemplified, the application 380 is operable to initiate a connection with the communication manager module 342 of the data acquisition unit 326 and receive real time vessel data from the communication module 342. The web application 380 is operable to send fetch data requests to a third-party weather application 382 and receive metrological data from the third-party weather application 382. The web application 380 is operable to send collected data to the server 312 and receive data for visualizations from the server 312. The web application 380 is operable to send processed data which may be used for data visualization for the user on the console 360 and receive input data (e.g., boat specifications and/or fuel price data) input by the user via the user console 360 (e.g., via a touchscreen or via another input device coupled to a screen).

In some example embodiments, the user will initiate the web application 380 and will input boat specifications and fuel price data. In some example embodiments, inputting boat specifications and/or fuel price data is automated. Boat specifications and/or fuel price data may be used as to provide values for input parameters of machine learning models. The web application 380 will connect to the vessel's data acquisition unit 326 which will provide real-time boat data such as, but not limited to, boat speed, GPS coordinates, etc. The web application 380 will also (e.g., simultaneously) include a computer program to fetch meteorological data from the third-party application 382 (e.g., an online WindFinder™ application or similar application for meteorological data) on a schedule (e.g., once every hour or day). The boat data, boat specifications, price data and meteorological data are sent to the backend server 312 for data collection and for predictive machine learning (e.g., used to train a machine learning model). Once the machine learning model is trained, the aforementioned data that is sent to the server 312 may then be processed by the machine learning model to provide estimated data for one of the vessel parameters (e.g., emissions, torque output, etc.). In some embodiments, the system 300 may use a machine learning regression model(s), such as Random Forest Regression (e.g., using Scikit-learn™), Support Vector Machines (e.g., using Scikit-learn™), Deep Neural Networks (e.g., using PyTorch™ and/or TensorFlow™), and/or similar approaches. The machine learning model(s) may be updated, retrained or finetuned on the backend server 312. In some embodiments, data is normalized before being processed by a machine learning model. Normalization of the data may be done by the server 312, which normalizes qualitative values to a numerical representation (e.g., a one-hot encoding or other standard encodings) and quantitative values to a standardized range (e.g., −1 to 1, 0 to 1, or other standardized minimum and maximum values based on the type of data). The vessel and meteorological data, along with the output (e.g., estimated data) from the machine learning model, will be used by the web application 380 for data visualization for the user.

Figure 13:
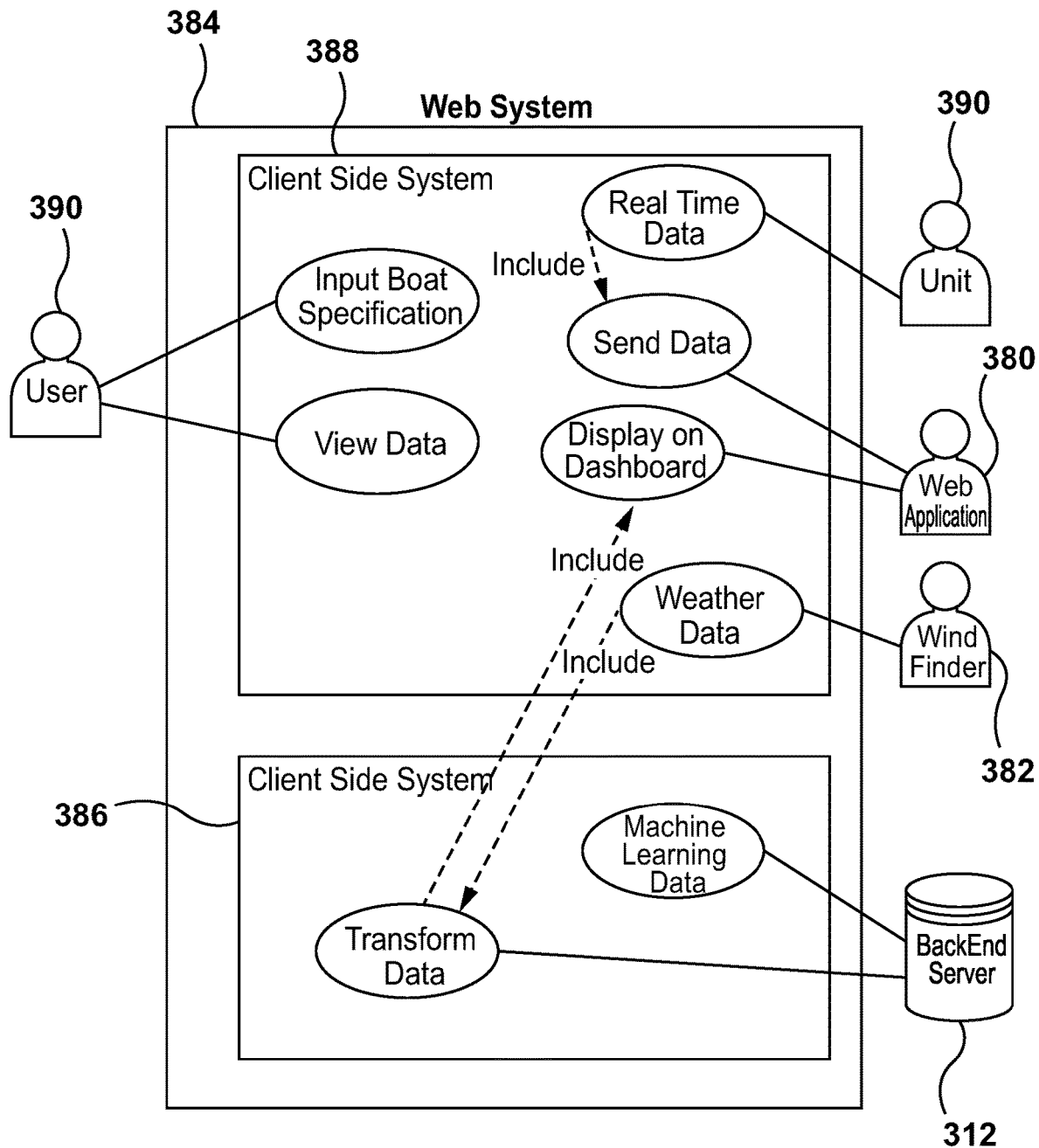
FIG. 13 is a schematic diagram of a web system of the system of FIG. 9.

As exemplified in FIG. 13, the embodiment of FIG. 12 may be implemented using a web system 384 that includes a back-end system 386 and a client-side system 388. As described with respect to FIG. 12, the user 390 is able to input boat specification data and price data as well as view data via the client-side system 388 via a website or other network site that the user may view on a user electronic device such as a laptop, desktop, tablet, or smartphone, for example. The data acquisition unit 326 is able to send real time boat data to the client-side system 388. The web application 380 is able to display information and send and receive information on the client-side system 388. The third-party weather application 382 is able to send weather data on the client-side system 388. The server 312 is able to retrieve boat specification data, price data, vessel data and weather (e.g., meteorological) data as well as machine learning data (e.g., output) from the back-end system 386 and process the data which is provided to transform the data such that it may then be displayed on the client side system 388 such as via a visual dashboard on a display. The back-end system 386 is able to send data to and receive data from the front-end system 388.

Referring again to FIGS. 9-13, the remote server 312 is operable to run a predictive machine learning model. The machine learning model may, e.g., generate estimated or predicted data that may be used to tell the user if the vessel is running efficiently. The system 300 may inform the user by way of data visualizations (e.g., charts, graphs, etc.).

In some example embodiments, the user inputs the vessel specifications (e.g., length, engine size, fuel cost per unit, engine weight, number of people aboard, general hull shape, number of engines, size of propeller, type of propeller, loaded versus empty weight, width, gross tonnage, instrumentation on board, draft, appendages hull condition, and/or hull coating) for a given vessel. The web application 380 then accesses a database at the server 312 to access a stored vehicle data set that best matches the vessel specifications (e.g., a relevant bin of data). The stored vehicle data set may be used to give the vessel operator a preliminary power curve and fuel consumption curve. The curves may be built from data collected in particular meteorological conditions. In some embodiments, an average of data sets over time will be used to see if there are trends, e.g. more power required, which may be used to identify issues, e.g., hull founding slowing the boat. Sudden power curve changes (e.g., more than 5% or more than 10% between data gathering sessions) may indicate damage, e.g., to the propeller.

Over time as data is collected by the sensors on the given vessel these curves can be augmented and refined. However, if the given vessel is not fitted with sensors and/or a dedicated data acquisition unit (e.g., unit 126) is not available, then over time other data sources may be used to generate accumulated data at the server 312 where the other data sources may from other vessels that are accessible by the server 312. The accumulated data will increase the quality (e.g., accuracy) of the estimated data that is generated by the server 312. Alternatively, or in addition thereto, another information source may be a mobile device aboard the given vessel, such as a smartphone aboard the given vessel, which can provide data for the given vessel that may also increase the accuracy of the estimated data. For example, the smartphone may provide information such as accelerometer readings and global positioning system (GPS) information. In some example embodiments, the data is used by the server 312 to estimate how much fuel (e.g., liters or gallons or other units) and/or cost (e.g., cost for estimated fuel used, or estimated costs of fuel and wear and tear) will be needed to complete a desired trip for the given vessel. The web application 380 can also let a user know how much fuel they are using in real time as they travel (e.g., if they have power and fuel curves downloaded in advance of the trip).

The communications manager 342 may be a combined device (e.g., transceiver) and software component that manages data communications. The communications manager 342 may handle related functions such as data compression, data cleaning, asynchronous communication, data buffering, and data forwarding.

Figure 14:
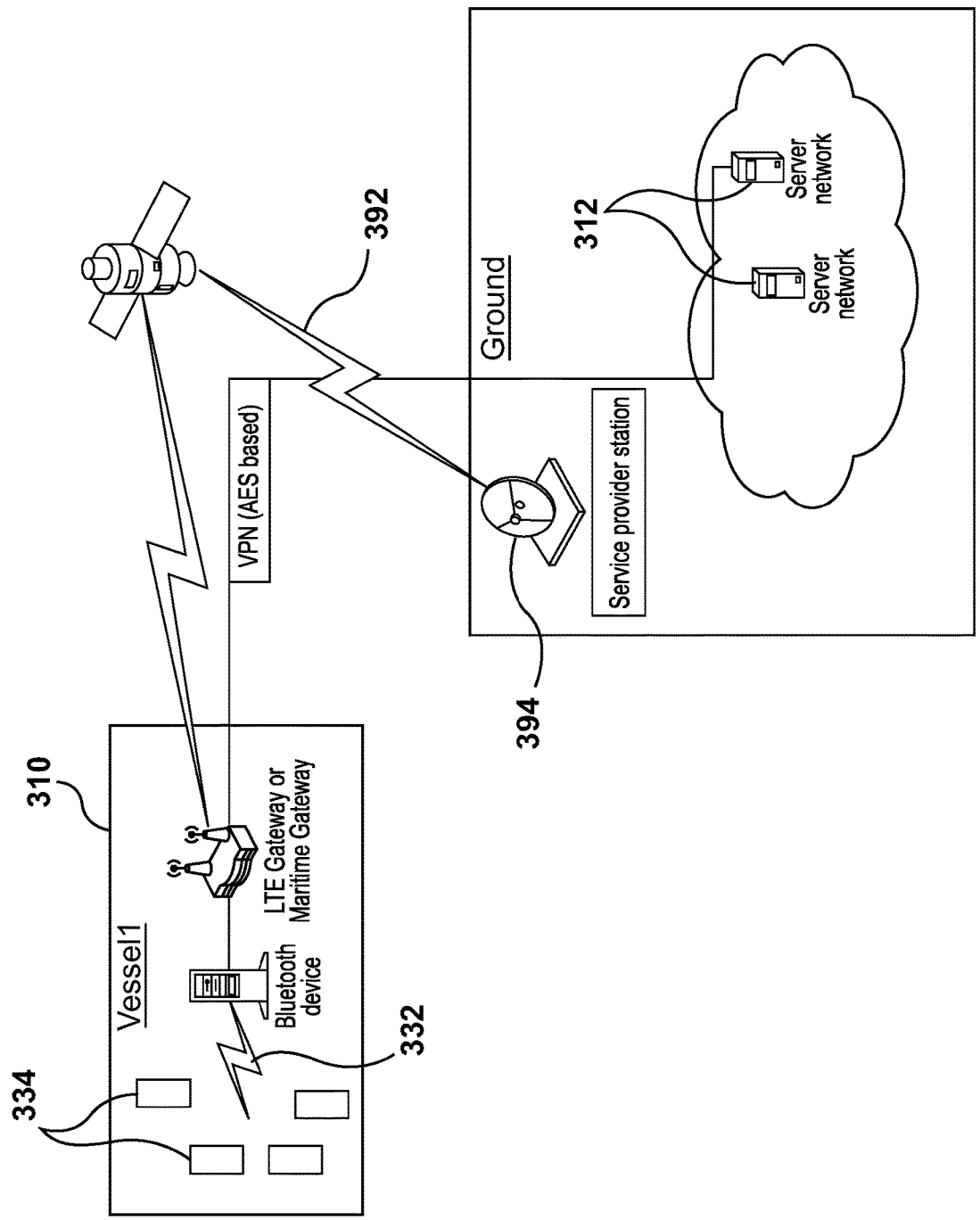
FIG. 14 is a first schematic diagram of a vessel communicatively coupled to a remote server.
Figure 15:
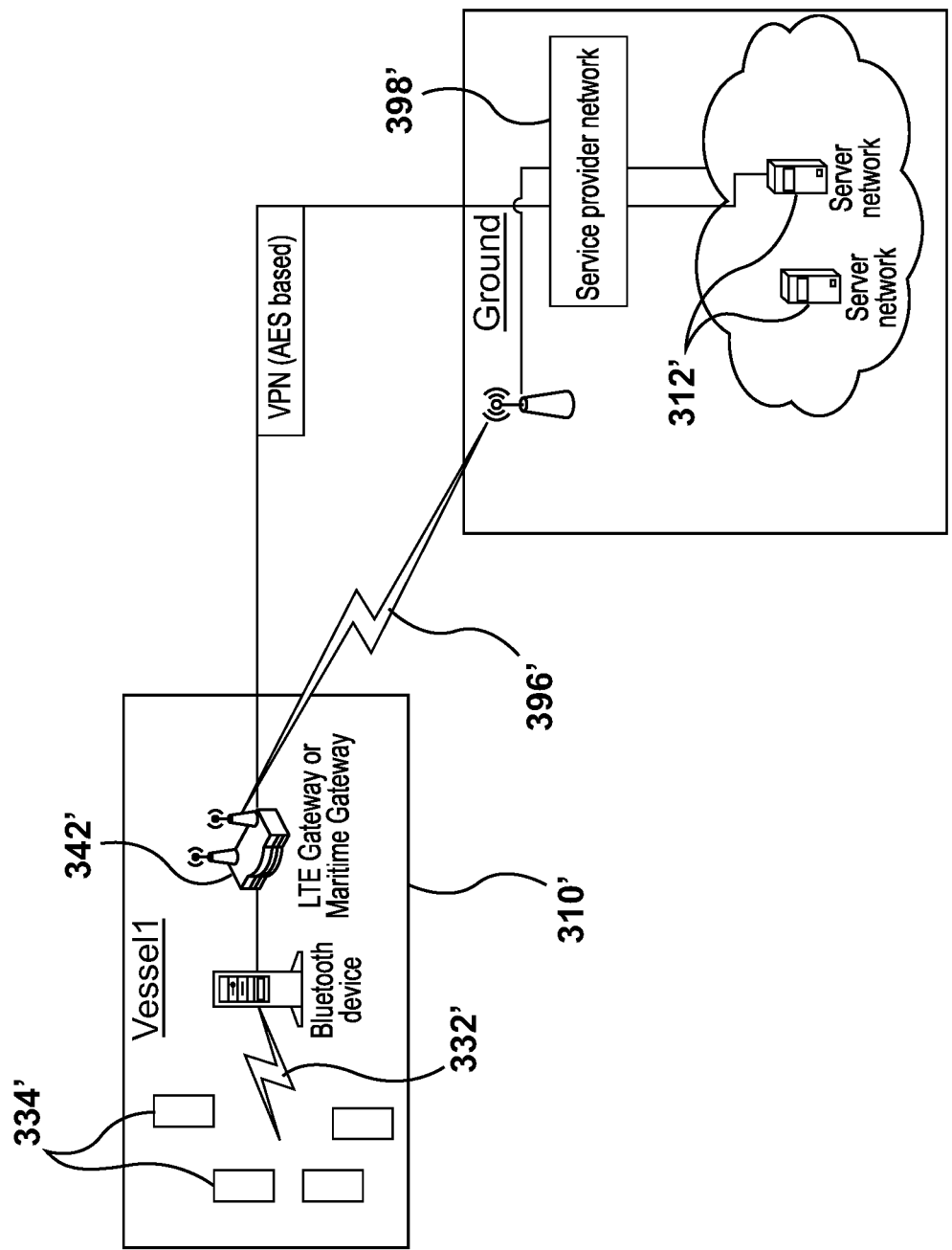
FIG. 15 is a second schematic diagram of a vessel communicatively coupled to a remote server.

Referring to FIGS. 14 and 15, in some example embodiments data encryption for data communication between the vessel 310 (i.e., vessel-mounted systems) and a ground station (e.g., server 312) is used. For example, data encryption may be provided via virtual private networks (VPN) on a long-term evolution (LTE) backbone. Data stored on the server 312 can be accessed via mobile applications or management clients using, e.g., secure socket layer/transport layer security (SSL/TLS) connections. When there is no connection to the ground station, secure fallback mechanisms will be activated, including encrypted on-board data storage and lower-resolution data capture. At the ground station (e.g., server 312) the data will be stored in a database after server-side data normalization. In some example embodiments, device on-chip encryption solutions may be used.

FIG. 14 illustrates an exemplary vessel 310 with a data acquisition unit using Bluetooth™ peripheral device couplings 332 to collect vessel and/or weather data from peripheral devices 334. A communications module 342 of the vessel 310 sends the collected data via a VPN (advanced encryption standard (AES) based) on a satellite network 392 to a service provider station 394 which routes the collected data to one or more servers 312.

FIG. 15 illustrates an alternative exemplary vessel 310' with a data acquisition unit using Bluetooth peripheral device couplings 332' to collect vessel and/or weather data from peripheral devices 334'. A communications module 342' of the vessel 310' sends the collected data via a VPN (AES based) on a cellular network 396' to the service provider network 398' which routes the collected data to the servers 312'.

Referring again to FIGS. 9-11, the sensor array 364 is added to the vessel 310 to provide ancillary data, such as vessel data and/or weather data in the vicinity of the vessel, that will be provided to the web application 380. The ancillary data include one or more of: GPS data, vessel location, vessel heading, vessel speed, time, IMU data, 9-axis accelerometer/gyroscope/magnetometer, anemometer data, wind velocity, fuel flow, dual fuel flow meter data, drive shaft torque measurements and/or power measurements. The ancillary data is accessed by the data acquisition unit 326. The data acquisition unit 326 logs the ancillary data locally and/or transmits the ancillary data sent to the server 312 where it may be accessed by the application 380 in near real time. In some embodiments, sensors except the IMU update at about 1 Hz and the IMU updates at about 5-10 Hz.

In some example embodiments, the vessel integration and management module 366 is a software component that monitors and manages the integration of local technology and control systems. As an example, it will notify or log any operational anomalies. For example, if the sensor array 364 is not operational this component will log the instance and notify the operator via the vessel console 360. The module 366 will also communicate to the server 312 for logging and notification to commercial users (fleet management). In some example embodiments, the module 366 also integrates the functionality of the local software and/or hardware, such as the autopilot 368 for instance, by routing data between these components. For example, a recommended course from the server 312 may be fed to the autopilot 368 via the module 366.

The optional autonomous operations module or autopilot 368 may be included as part of the data acquisition unit 326 or external to it. The autopilot 368 will interface to the server 312 to provide feedback on the effect of autonomous decisions or recommendations.

The vessel privacy and security module 369 will monitor and control the use of data. In some embodiments, the module 369 is a software routine that anonymizes the data and offers encryption.

The vessel 310 includes a vessel console 400 (e.g., a hardware device, such as a display or panel computer on the boat used to control the electric system on board), an electrification motor kit 402, and a vessel state parameters module 404.

The vessel console 400 is operable to provide the user (e.g., vessel operator) with visualizations and data from the server 312 (e.g., via a screen of the console 400). The vessel console 400 provides access to the condition and status of components, monitoring alerts, sensor array status, navigation assistant, the status of integration with external components such as the autopilot, and the status of communication connections. The console 400 is bidirectional to support operator input so that an operator can provide input data such as, but not limited to, destinations and routing scenarios, for example. User inputs are processed by the server 312. The user interface runs on a local computer with supervisory control and data acquisition (SCADA) capabilities. In some embodiments, the console 400 is operable to control the electric boat equipment, and console 360 is a separate hardware console for the data acquisition unit 326.

The optional electrification motor kit 402 is an electrical motor and clutch assembly to drive the vessel 310. The vessel state parameters module 404 (e.g., supplying data collected through sensors) manages functions associated with data storage such as data backup and data retrieval along with storage and forward capacity/functionality. The vessel state parameters module 404 may instruct the electric motor kit 402 hardware to perform a series of one or more measurements, and may store measurement data such as one or more of state of charge, voltage, current, breaker positions, etc. This measurement data may be displayed on the console 360. The measurement data lets the operator know in real-time or near real-time how the vessel 310 is operating (e.g., if there are any mechanical issues or user caused anomalies such as erratic driving) and what operating conditions it is under (e.g., weather-related conditions).

Referring to FIG. 11, the remote server 312 includes a console 406, a marine sensor data system 408, an integration and management system 410, an Artificial Intelligence (AI) module 412 which may include one or more machine learning modules, a privacy and security module 414, and a communications module 416.

The console 406 provides access to the server 312. The console may include hardware and/or software. The console 406 will be used to serve both internal access needs and customer access. The data provided via the console 406 may be role based dependent on the clearance of the user. For example, users with operation management clearance may access and view one or more of condition and status of services, monitoring alerts, job configuration and reporting, consumption of data reporting, communication feed alerts, status of communication connections, availability and performance reporting, access to data access logs, metering of data access usage, dashboards, notification management, billing/usage reporting, and/or data changes resulting from the machine learning activities (i.e., machine learning output). As another example, users with commercial or research clearance may see what users with operation management clearance see, but limited to the user's own activities with the server 312 such as, but not limited to, one or more of account monitoring alerts, account job configuration and reporting, account dashboard, account notification management, account billing/usage reporting, account predefined reporting and/or data extracts.

The marine sensor data 408 is the raw data stored in a database (also referred to as a knowledgebase).

The AI module 412 is hardware (e.g., one or more processors) and/or software. In some example embodiments, the AI module 412, assists the operator to plan trips by combining data from several sources including, but not limited to, one or more of vessel attributes, local sensors on the vessel, and/or geospatial land base data within the server 312 to provide estimated trip data. For example, the estimated trip data may include, but is not limited to, (a) estimations of operational parameters and/or routing optimization that includes distance and/or traffic volume, (b) environmental factors such as wind, currents, metrological and/or season factors (e.g., weather) and/or (c) current engine capacity and/or performance.

The integration and management module 410, the privacy and security module 414, and the communications module 416 are similar to, respectively, modules 366, 369, and 342, respectively.

Figure 16:
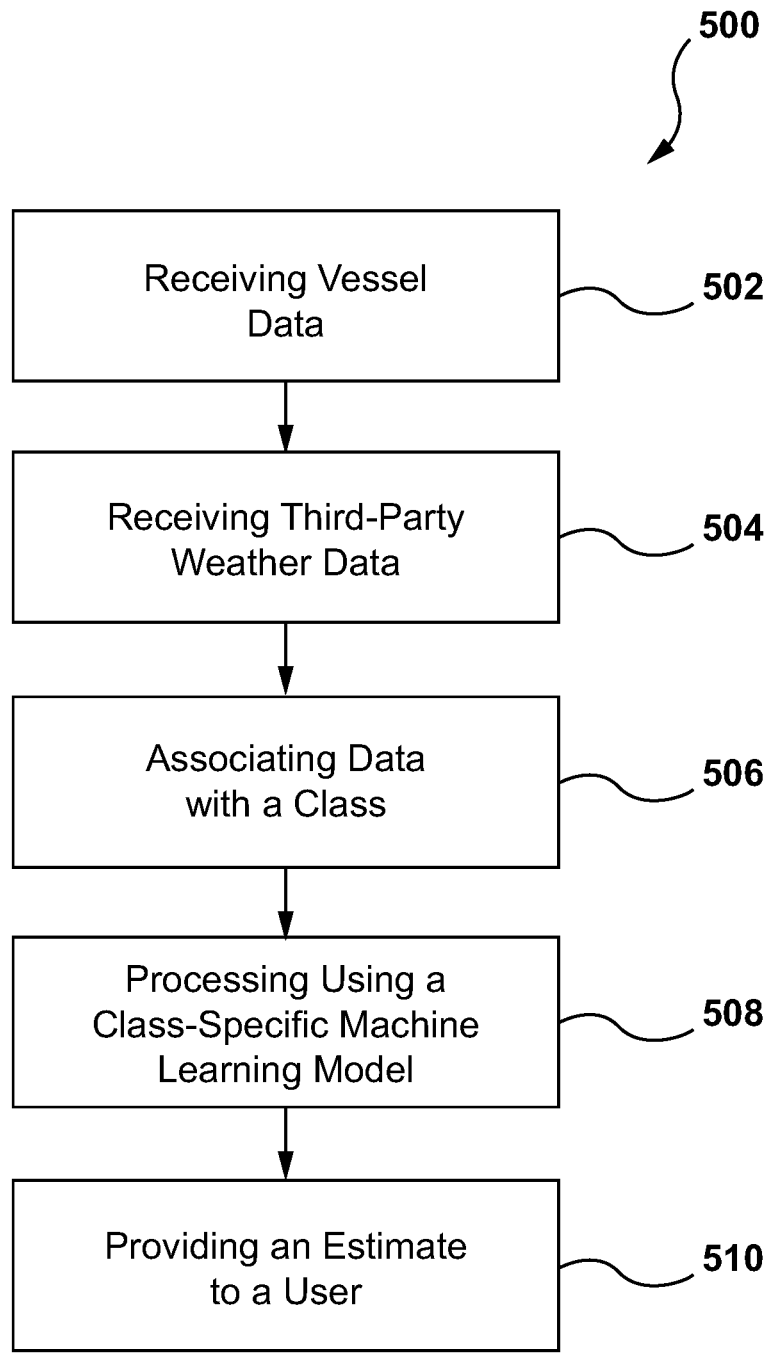
FIG. 16 is a flow chart of a method of estimating an operational parameter of a marine vessel.

Referring now to FIG. 16, illustrated therein is a method 500 of estimating an operational parameter of a marine vessel. In some example embodiments, the method 500 is carried out by the system 100. For ease of illustration, the method 500 will be described as being performed by the system 100. For example, the processor 116 may be operable to execute software, which configures the processor 116, to carry out one or more operations of the method 500.

The method 500 includes, at step 502, receiving vessel data (i.e., actual operational parameters) from a marine vessel (e.g., vessel 110). The vessel data includes data from sensors mounted on the vessel and/or from operational systems of the vessel. The vessel data may be received by the processor 116 when the processor 116 requests data from various components and/or sensors associated with the vessel or the processor 116 may access this data from memory.

In some example embodiments, the vessel data includes at least vessel speed through water. In some embodiments, the vessel data includes at least two different types of measurement data such as, but not limited to, actual fuel flow to an engine or engines of the vessel (e.g., fuel consumption rate), actual speed of the vessel through water, actual speed of the vessel over land, actual direction of the vessel, actual weather conditions (e.g., air temperature, air pressure, wind speed, and/or wave height), actual vessel motion (e.g., as measured by an inertial measurement unit), actual torque output, actual drive shaft revolutions per minute (i.e., the RPM of the propeller shaft), actual vessel power, and actual emission output of the subject vessel. In some example embodiments, at least two different types of measurement data include actual motion data (i.e., IMU data) and actual speed though water data.

In some example embodiments, step 502 includes installing an after-market data acquisition unit on the vessel (e.g., data acquisition unit 126) such as was described for system 100 of FIG. 1. In some example embodiments, step 502 includes communicatively coupling the data acquisition unit to at least one vessel operational system (e.g., a drive system) and/or sensor mounted to the vessel to receive the vessel data from the at least one vessel system and/or or sensor and sending the data to a remote data storage device (e.g., device 114) using the data acquisition unit such as was described for system 300. In some example embodiments, the data is processed using at least one processor communicatively coupled to the remote data storage device (e.g., processor 116).

In some example embodiments, the method 500 also includes, at step 504, receiving third-party weather data corresponding to a time and a location at which the vessel data was recorded. In some example embodiments, the third-party weather data is from a weather forecast corresponding to the time and the location at which the vessel data was recorded. In some example embodiments, the third-party weather data is a weather estimate corresponding to the time and the location at which the vessel data was recorded, the weather estimate being based on third-party weather data recorded at a nearby location and/or a nearby time (e.g., other vessels, buoys, weather balloons, etc.). The third-party weather data may be received by the processor 116 when the processor 116 requests data from the weather data source or the processor 116 may access this data from memory.

The method 500 also includes, at step 506, associating the vessel data with a particular vehicle class. The vehicle class is one of a set of vehicle classes. The classes may be considered as being divisions, bins or vectors that have values for at least one parameter associated with the vessel data. In some example embodiments, the classes may include values for parameters based on one or more of a vessel length of the subject vessel, an engine size of the subject vessel, and/or a weather system associated with a time and a location at which the vessel data was collected. In some embodiments, a class is based on vessel length, width, draft, weight, and engine size. Step 506 may include using ranges for parameters, if a parameter associated with a set of data falls within the range of a class the data may be associated with that class. If all parameters are not available for a set of data, an estimated parameter may be supplied. Step 506 may be carried out by, e.g., processor 116.

The method 500 also includes, at step 508, generating an estimated equivalent for at least one component of the vessel data by processing the vessel data using a vehicle class-based machine learning model. For example, a first vehicle class-based machine learning model or set of vehicle class-based machine learning models (e.g., one for each of a plurality of data items) may be trained using a database of data from vessels that are associated with a first vehicle class. A second vehicle class-based machine learning model or set of models may be trained using a database of data from vessels that are associated with a second vehicle class. This may be repeated to obtain N vehicle class-based machine learning models that are based on a unique class from the N vehicle classes The present inventors have found that training different machine learning models based on data from different vehicle classes aids in improving the performance (e.g., accuracy) for estimating data for a given vehicle when the determined vehicle class of the given vehicle that was determined in step 506 is used to select the vehicle class-based machine learning model that corresponds to determined vehicle class.

In some example embodiments, step 508 may include generating the estimated equivalent for at least one of, but not limited to, the actual fuel flow, the actual speed through water, the actual speed over land (e.g., speed through water combined with current, wind, and tidal vectors), the actual direction, the actual weather conditions, the actual vessel motion, the actual torque output, the actual drive shaft revolutions per minute, the actual vessel power, and the actual emission output of the subject vessel. In some example embodiments, where the method 500 includes step 504, step 508 may also include, in generating the estimated equivalent, processing the third-party weather data using the vehicle-class based machine learning model. Step 508 may be carried out by, e.g., processor 116. In some embodiments, a machine learning model is trained for each data item, and then the trained machine learning model that was trained for a particular data item is used to determine the estimated equivalent for that data item. For example, a set of machine learning models for a particular class may include a first machine learning model trained on fuel flow data and used to generate an estimated equivalent for fuel flow, a second machine learning model trained on speed through water data and used to generate an estimated equivalent for speed through water data, a third machine learning model trained on torque data and used to generate an estimated equivalent for torque data.

The method 500 also includes, at step 510, providing the estimated equivalent to a user and/or storing the estimated equivalent. For example, the method 500 may include sending the estimated equivalent to a user device (e.g., smartphone) of the user, and/or displaying the estimated equivalent on an electronic display (e.g., a screen of the smartphone or console). Step 510 may be carried out by, e.g., processor 116.

In some example embodiments, the estimated equivalent is a replacement for a data item (e.g., an operational parameter) that is not otherwise available. In some example embodiments, the vessel data may not include at least one of the actual fuel flow, the actual speed through water, the actual speed over land, the actual direction, the actual weather conditions, the actual vessel motion, the actual torque output, the actual drive shaft revolutions per minute, the actual vessel power, and the actual emission output of the subject vessel and at least some of the vessel data that is available is provided as input to the vehicle-class based machine learning model which then generates the estimated equivalent of the one or more missing data items.

As another example, the vessel data may not include the actual torque output, the actual drive shaft revolutions per minute, and the actual vessel power. In some embodiments, the estimated equivalent includes an estimation of at least one of the actual torque output, the actual drive shaft revolutions per minute, and the actual vessel power. This is useful since torque and/or power may be difficult to directly measure since this may involve using equipment and/or conditions that are difficult to establish. In some example embodiments, the training data used to train the vehicle-class based machine learning model includes torque and/or power data from functional vessels (e.g., a commercial fishing boat) of the same vehicle class as the subject vessel on a functioning vessel. In some example embodiments, the vessel data does not include the actual torque output, and the estimated equivalent includes an estimation of the actual torque output which may be done using a vehicle-class based machine learning model that is trained as previously described.

In another example, the vessel data may not include actual emissions output of the subject vessel due to measurement difficulty since measuring emissions may involve using equipment and/or conditions that are difficult to establish on a functioning vessel (e.g., a commercial fishing boat). Accordingly, in some example embodiments, a vehicle-class based machine learning model may be used to generate estimated emissions output where the model is training using training data that includes emission data from vessels of the same vehicle class of the subject vessel.

In another example, the vessel data may not include the actual weather conditions. In some example embodiments, the vehicle-class based machine learning model may be trained, in a similar manner as previously described, to generate estimated weather conditions that approximate actual weather conditions. The actual weather conditions may include wave height data and wind speed data.

In some example embodiments, providing the estimated equivalent to a user includes associating the estimation of the actual emission output with a product or service. For example, an estimation of the emissions produced during a fishing operation may be associated with the fish caught during the operation. Accordingly, operating a fishing vessel on quitter waters may result in fish that are associated with lower emissions values. As another example, an estimation of the emissions produced during a trip may be compared to the emissions that would have been produced by a different power system, such as comparing the diesel engine of a tour boat to an electric drive system or a hybrid diesel-electric drive system that could replace it.

In some example embodiments, the estimated equivalent may be compared to a value of an actual data item. In some example embodiments, step 510 may include comparing the estimated equivalent to a value for the corresponding actual data item and then taking an action depending on the results of the comparison. For example, step 510 may include generating an alert when the difference between the estimated equivalent and a value for the corresponding actual item is greater than a threshold. The threshold may be, e.g., a predetermined value or a percentage of the estimated value. For example, the threshold may be a difference of at least 5%, at least 10%, or at least 20% of the estimated equivalent.

In some example embodiments, step 510 includes comparing the estimated equivalent to at least one of the actual fuel flow, the actual speed through water, the actual speed over land, the actual direction, the actual weather conditions, the actual vessel motion, the actual torque output, the actual drive shaft revolutions per minute, the actual vessel power, and the actual emission output. In some example embodiments, step 510 includes generating the alert when the difference between the estimated equivalent and the value for at least one of the corresponding actual fuel flow, the actual speed through water, the actual speed over land, the actual direction, the actual weather conditions, the actual vessel motion, the actual torque output, the actual drive shaft revolutions per minute, the actual vessel power, and the actual emission output is greater than the threshold or outside of an expected acceptable range of values.

In some example embodiments, the alert includes a remediation suggestion or a maintenance warning. The remediation suggestion may be a suggestion to check a component that is associated with a data item for which an estimated value is flagged based on the difference between an estimated value and an expected value is larger than a corresponding threshold or the estimated value is outside of an acceptable range of values. The component may be determined from estimated values that are flagged as described previously for estimated values that are generated by the vehicle-class based machine learning model that is trained using supervised or unsupervised learning based on training data from vessels of the same vehicle class as the subject vessel. For example in some cases, the remediation suggestion may include inspecting a propeller or inspecting a filter. In another example, the alert is a maintenance warning that may suggest at least one operational system component for review. The operating system component suggested for checking may be determined by the machine learning model based on supervised or unsupervised learning based on the database of data from the vessels of the same class as the subject vessel. As another example, the comparison of the estimated value to a threshold or acceptable operating range may indicate high hydrocarbons which indicate overfilling with oil or leaks in the engine.

In some example embodiments, a system (e.g., system 100) for analysing marine vessel data includes a hydrophone such as a hydrophone provided by Geospectrum Technologies™. For example, the hydrophone may be configured to measure sound from the hull, propeller, and/or internal machinery. In some embodiments, the hydrophone is installed close to the engine and propeller. The hydrophone will measure noises over a set period of time then alerts will be made if the noise profile changes by a predetermined percentage, such as 5%, 10%, or 20% of the baseline. Underwater noise pollution estimates may be generated from the sound data collected. Also, or alternatively, changes in sound from the hull, propeller and/or internal machinery may indicate changes in the performance of these elements.

In some example embodiments, the change in sound may be detected which will result in the system creating an alert that will allow the operator to have advance warning and identify possible areas requiring maintenance. In some example embodiments, all non-maintenance related sounds will be discarded. For example, this may be done by recording only specific frequency bands that do not include non-maintenance related sounds or by filtering out certain frequencies from the recorded sound data. In some embodiments, voice sounds etc. will not be recorded. Recording only specific frequency bands and/or not recording voice sounds may assist in maintaining the privacy of individuals who are near the vessel. In some embodiments, filters remove at least one signal frequency, e.g., frequencies that are not required for analysis.

For example, a method of using hydrophone data may include a step of receiving data from a subject vessel over a period of time, the data including hydrophone data, another step of detecting an abnormality in the hydrophone data, another step of associating the abnormality with an operational system component of the subject vessel, and a step of generating a maintenance alert identifying the operational system component for further attention such as maintenance, repair, or replacement. In some embodiments, the hydrophone data is generated by a hydrophone configured to measure sound from, but not limited to, a hull, a propeller, an engine, gearing, a motor, and/or a bearing of the vessel. In some embodiments, the data received from the subject vessel further includes fuel flow data, and detecting the abnormality in the hydrophone data includes detecting the abnormality in the hydrophone data in view of the fuel flow data. For example, if the noise of the engine is changing and the fuel flow is also changing this may indicate a problem with the engine.

Figure 17:
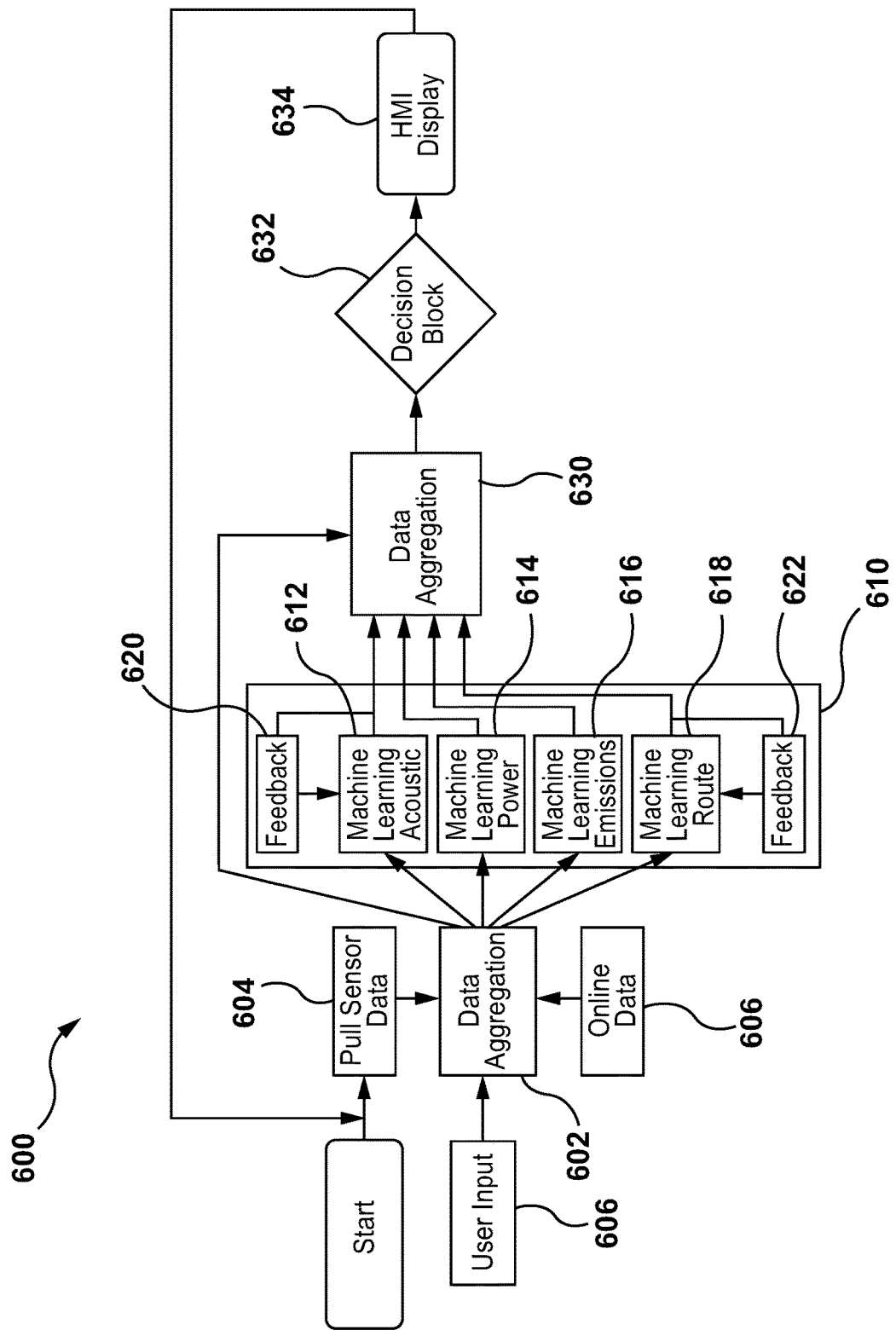
FIG. 17 is a flow chart of a second method for using vessel data.

Referring now to FIG. 17, illustrated therein is another method 600 of estimating an operational parameter. The method 600 includes, at step 602, aggregating data from local sensors on a vessel and, if available, from data sources accessible remotely (e.g., over networks such as a wireless network, if the network is accessible). Step 602 includes, at sub-step 604, pulling data from local sensors such as, but not limited to, polling data from a 9-axis IMU, a GPS, one or more flow meters, a weather station (temp, pressure, wind velocity), and/or an acoustic sensor (e.g., hydrophone), for example. Step 602 may also include, at sub-step 606, aggregating data from user inputs such as, but not limited to, desired destination, and/or throttle/heading control, for example. Step 602 may also include, at sub-step 608, aggregating data from online data sources where the data includes, but is not limited to, tidal/current data, local weather information/forecast, and/or map database data.

Method 600 also includes, at step 610, applying one or more machine learning modules (e.g., a machine learning regression model(s), such as Random Forest Regression, Support Vector Machines, Deep Neural Networks, and/or similar approaches, as described above) to at least some of the aggregated data obtained from step 602. Step 610 may include, at sub-step 612, applying an acoustic machine learning model trained to detect acoustic spectrum differences. Step 610 may include, at sub-step 614, applying a vessel drive machine learning model trained to estimate vessel drive shaft power. Step 610 may include, at sub-step 616, applying an emissions machine learning model trained to estimate emission data for the vessel. Step 610 may include, at sub-step 618, applying a route machine learning model trained to suggest a route. The machine learning model trained to suggest a route may choose an optimal route if a destination is provided, and otherwise provide feedback on vessel performance in real time. Any of sub-steps 612 to 618 may be optional or may be selected based on user input.

In some example embodiments, step 610 includes, at sub-step 620, training the acoustic machine learning model from user input. In some embodiments, step 610 includes, at sub-step 622, training the route suggestion model from user feedback.

Method 600 also includes, at step 630, aggregating the input data from step 602 and the estimated data from the application or one of more of the machine learning models of step 610. For example, step 630 may involve the aggregation of GPS information, IMU 9 axis information, fuel flow information, anemometer information, temperature information, pressure information, weather database information, tide database information, and/or maps database data from step 602 as well as spectrum difference information, driveshaft power information, emission estimate information, and/or heading and speed information from step 610.

At step 632, method 600 includes applying the aggregated data from step 630 to generate data and/or suggestions for a user by making decisions by comparing one or more of the aggregated data items from step 630 to a corresponding threshold or acceptable range of values. At step 634, method 600 includes displaying the data and/or suggestions to the user. Method 600 may repeat as needed. Data and/or suggestions may be any of various types and a series of examples for this is provided below.

In a first example, step 602 includes gathering acoustic data from acoustic transducers. Changes are identified in the noise spectrum of the acoustic data (e.g., noise due to propellers, engines, gearing, motor, and/or bearings) by processing the acoustic data such as by monitoring changes in amplitude for frequency ranges associated with noises due to certain vessel components. These changes are identified at step 610, when the acoustic machine learning model applied at sub-step 612 detects the change and identifies possible causes and remediation and impacts to route recommendations/planning. In some embodiments, step 610 includes performing an anomaly detection task. For example, the anomaly detection task may include using a classification model trained to determine normal or abnormal behaviour, where abnormal behaviour may optionally be split into multiple different classes of abnormal behaviour. As another example, the anomaly detection task may include using a regression model trained to predict parameter values, and if the prediction is beyond a threshold difference from the actual value then the operator is warned.

In a second example, step 602 includes gathering vessel operational data from fuel flow sensors and sensors providing speed information. Step 610 may result in the identification of an increase in fuel flow from the fuel flow data and no change in speed based on the speed information. Possible causes (such as fouling, loading, something caught on propeller, and/or clogged filters) are identified and potential remediation is identified. Where no weather data or other data that could explain the fuel use is available, potential mechanical issues are identified and presented to the user for review. Step 602 may include applying one or more machine learning model. Automation and accuracy of estimating causes will evolve with machine learning. Alternately or additionally, step 602 may include traditional calculations.

In a third example, step 602 includes gathering data from fuel flow sensors and sensors providing vessel speed information. Step 602 also includes gathering data from weather sensors and/or third-party weather applications. At step 610 increases in fuel flow are identified while speed does not change. Possible causes (such as tidal changes, wind velocity, wave height, and/or local conditions) are identified. Potential remediation options may be identified. Since weather data that could explain the fuel use is available, the weather data is identified and may be presented to the user. There may be remediation options to reduce negative impacts of the weather conditions on vessel operations (e.g., reducing speed for more efficient fuel use or recommending an alternative route).

In a fourth example, step 602 includes gathering a destination input from a user and gathering weather data from on-board weather sensors (e.g., wind speed, wind pressure, temperature, pressure, wave height, and/or wave period sensors). Step 602 may also include gathering weather data from online weather data sources (e.g., if a communication connection is available). At step 632, potential route changes to minimize energy consumption and/or emissions production may be suggested.

In a fifth example, step 602 includes obtaining data which can be used to monitor for long term degradation of ship performance such as one or more of propeller damage, fouling, hull damage, etc. At step 632 potential remediation or maintenance suggestions are generated.

In a sixth example, step 602 includes obtaining data, e.g., through fuel flow sensors, etc., which may be used to determine if there is are increases in fuel use causing changes in air emissions. Step 610 includes identifying estimates, in the absence of exhaust gas measurements, of $CO_2$, $NO_x$, $SO_x$, $CH_x$ and other polluting emissions. Step 632 may include identifying environmental constraints to be suggested to the user at step 634 (such as limiting $CO_2$ emissions in environmentally protected areas).

In a seventh example, step 602 includes obtaining data, e.g., through fuel flow sensors as well as boat movement sensors and wind sensors, from which increases in fuel use and changes in weather conditions may be determined. At step 632, potential route changes to minimize energy consumption and emissions production are identified, to be suggested to the user at step 634.

In some example embodiments, users can see summaries of data associated with a vessel (e.g., vessel 110). For example, a user may be provided with a monthly and/or weekly summary of data for their vessel. The data provided may include either or both of the estimated equivalent and the actual recorded values. For example, a data set provided to a user may be a plurality of estimated equivalents to actual recorded values, and the user can then compare the estimated equivalents to the corresponding actual recorded values they have available to them (e.g., from the system, such as system 100, or from another source). A significant difference between the estimated and actual values may indicate that there is a problem such as, but not limited to, a component of the vessel which may not be operating properly, for example.

In some example embodiments, the system (e.g., system 100) or an application (e.g., a mobile or web application 380) associated with the system may generate a warning (e.g., an alert to be sent to a smartphone, or audible or visual alarm if the system is coupled to a light or speaker). The warning may be, e.g., a maintenance warning alarm.

Figure 18:
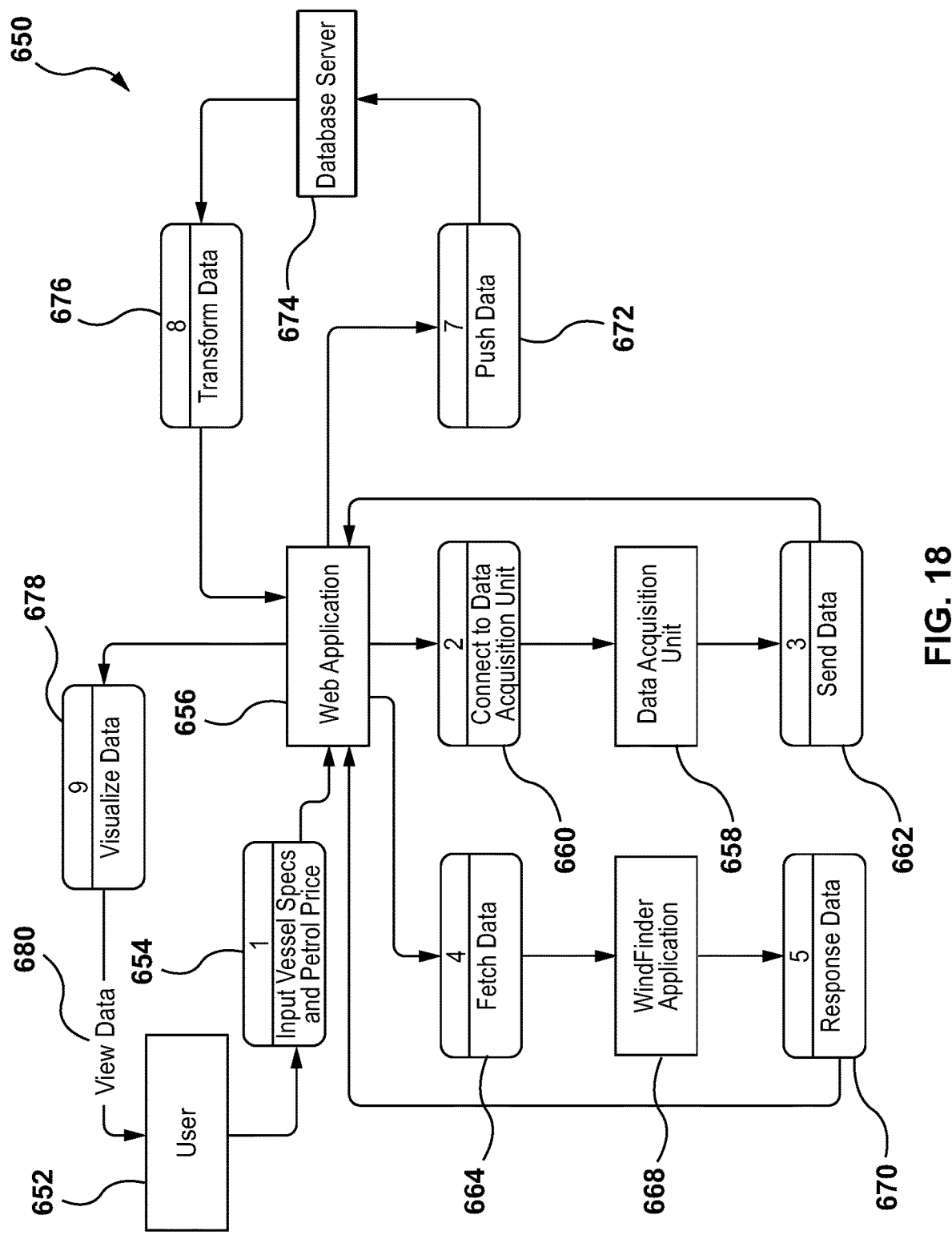
FIG. 18 is a flow chart of a third method for using vessel data.

Referring to FIG. 18, illustrated is a method 650 of generating an estimated equivalent. A user 652 inputs vessel specifications and fuel price information at step 654 for use by a mobile and/or web application 656. In some embodiments, at step 654 the vessel specifications and fuel price are entered automatically (e.g., from stored vessel records and/or public networks such as the internet). The application 656 connects to a data acquisition unit 658 (e.g., unit 126 or a smartphone) on a marine vessel (e.g., vessel 110) at step 660. At step 662 the data acquisition unit 658 sends back information to the application 656.

At step 664 the application 656 requests information from a third-party weather data source 668 (e.g., WindFinder™). At step 670 the third-party weather data source sends back weather data (e.g., meteorological data) to the application 656. At step 672 all the data gathered by the application 656 is pushed to the remote server 674 (e.g., server 112). The server 674 may match the data to a class based on the vessel specifications and/or weather data related to the vessel data gathered at step 662 as described earlier for FIG. 16. The server 674 analyses the data (e.g., via machine learning model(s) trained on class-specific data) at step 676 and send the analysis back to the application 656. At step 678 the application 656 will generate at least one data visualization and provide that to the user 652. At step 680 the user 652 may view the data visualization.

Figure 19:
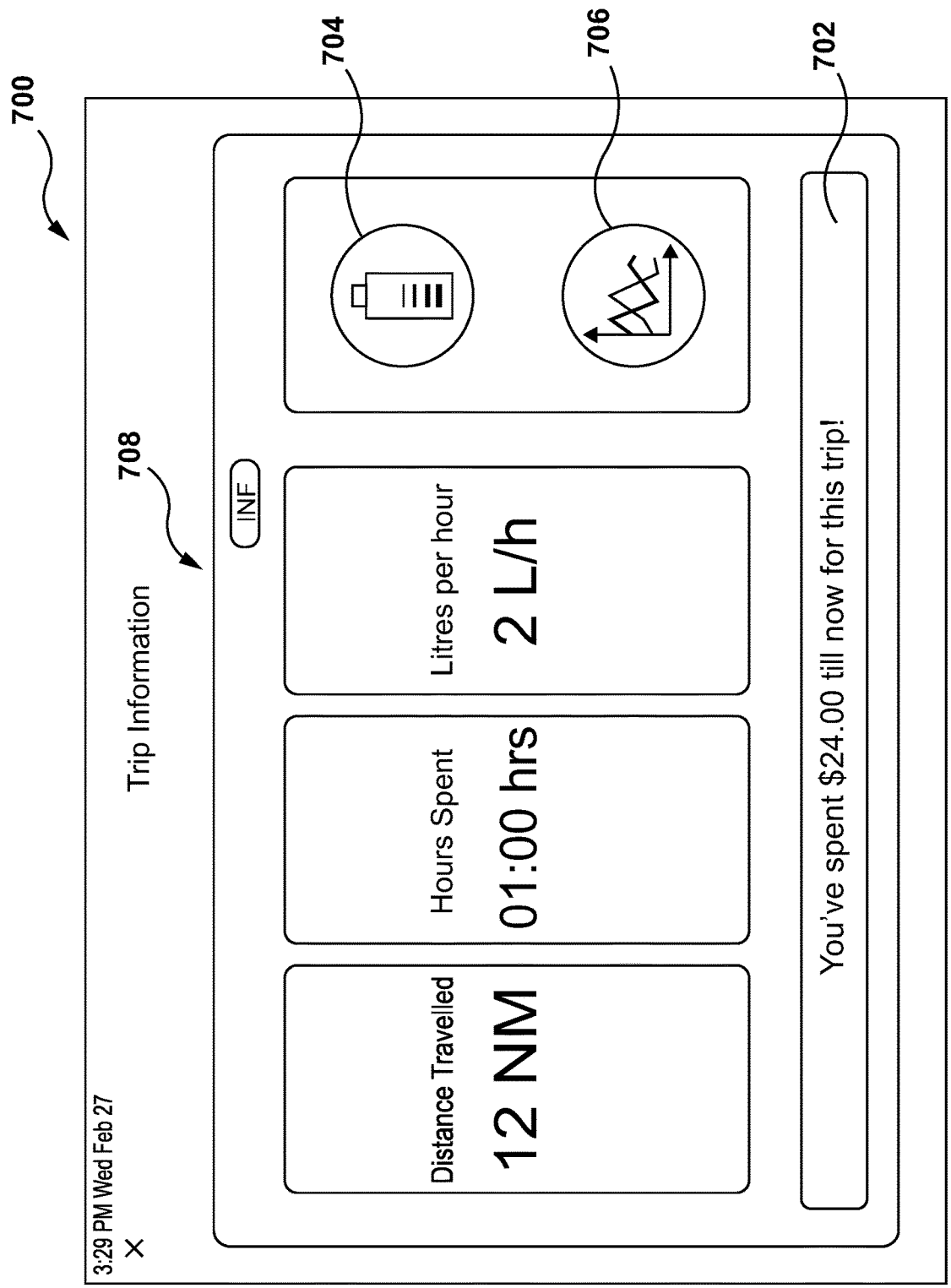
FIG. 19 is an example embodiment of a first user interface.

Referring to FIG. 19, illustrated therein is an example user interface 700. An application may provide a user with the user interface 700 that displays trip-specific savings 702 at the bottom of the interface. Values for status 704 and basic navigation controls 706 may be provided in the right panel of the interface 700. The illustrated user interface 700 is displaying a dashboard with three items 708 that have values which are actively updated. In some example embodiments, a user can click on an item to be provided with more detail.

Figure 20:
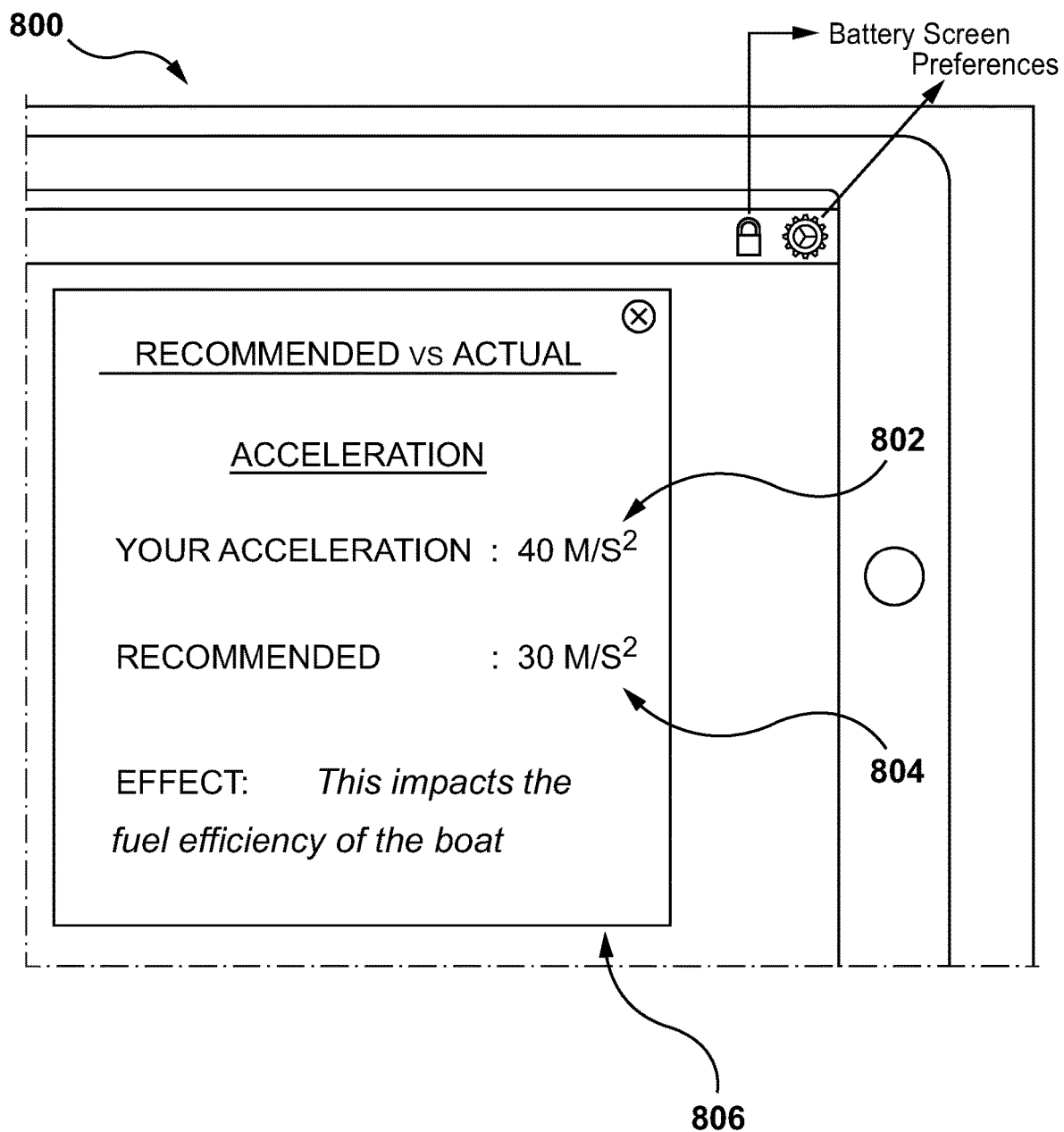
FIG. 20 is an example embodiment of a second user interface.

Referring to FIG. 20, illustrated therein is another example user interface 800. Interface 800 provides real-time information 802 in association with recommended practices 804 related to the real-time information 802. Interface 800 may also provide rational 806 for the recommended practice 804.

Referring now to FIGS. 21-26, illustrated therein are exemplary data visualizations which may be charts or graphs showing information of value to a user regarding the vessel. It will be understood that in some embodiments, data visualizations may be provided in other formats rather than charts or graphs, such as single data point displays as shown in FIGS. 19 and 20.

Figure 21:
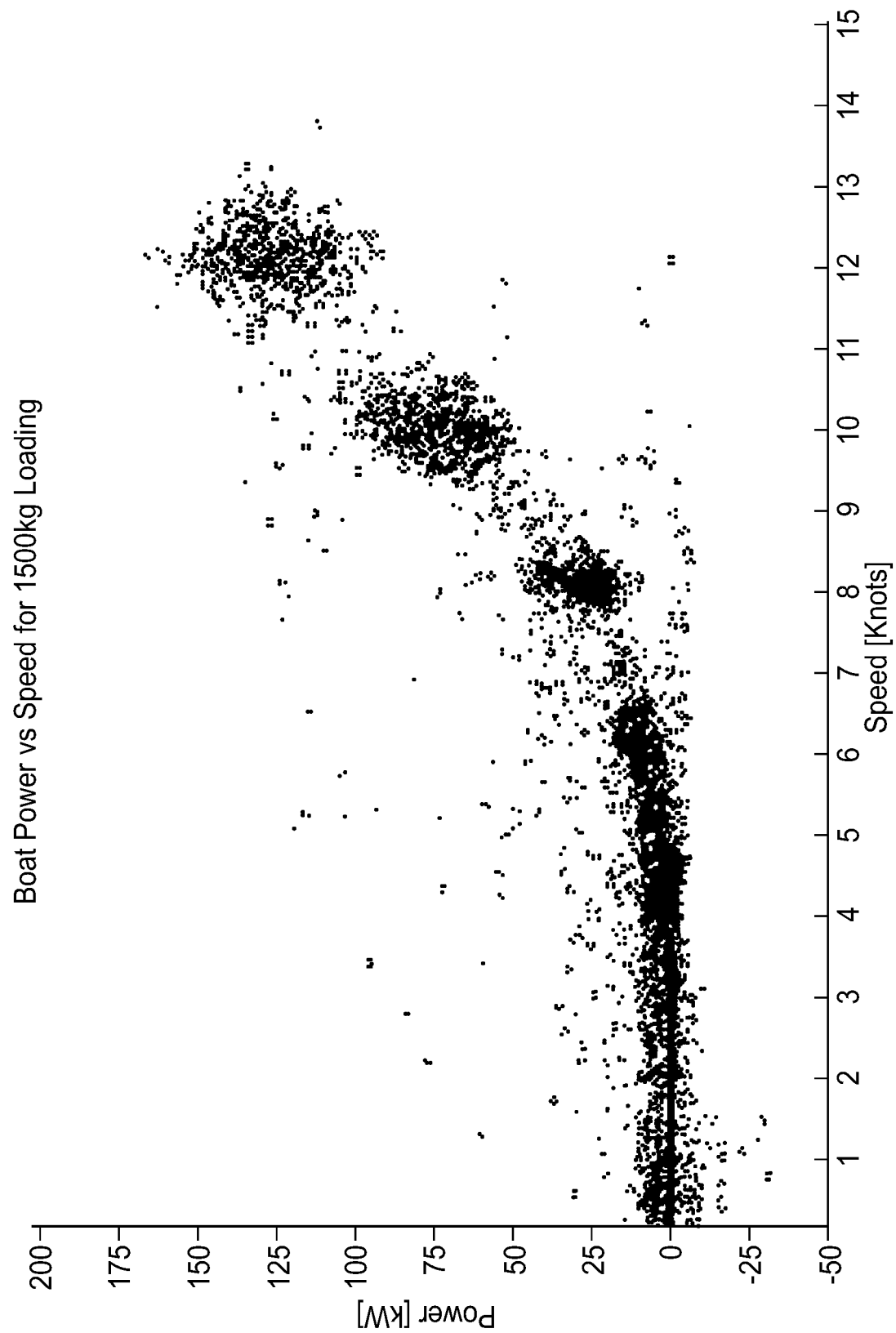
FIG. 21 is a first data visualization.
Figure 22:
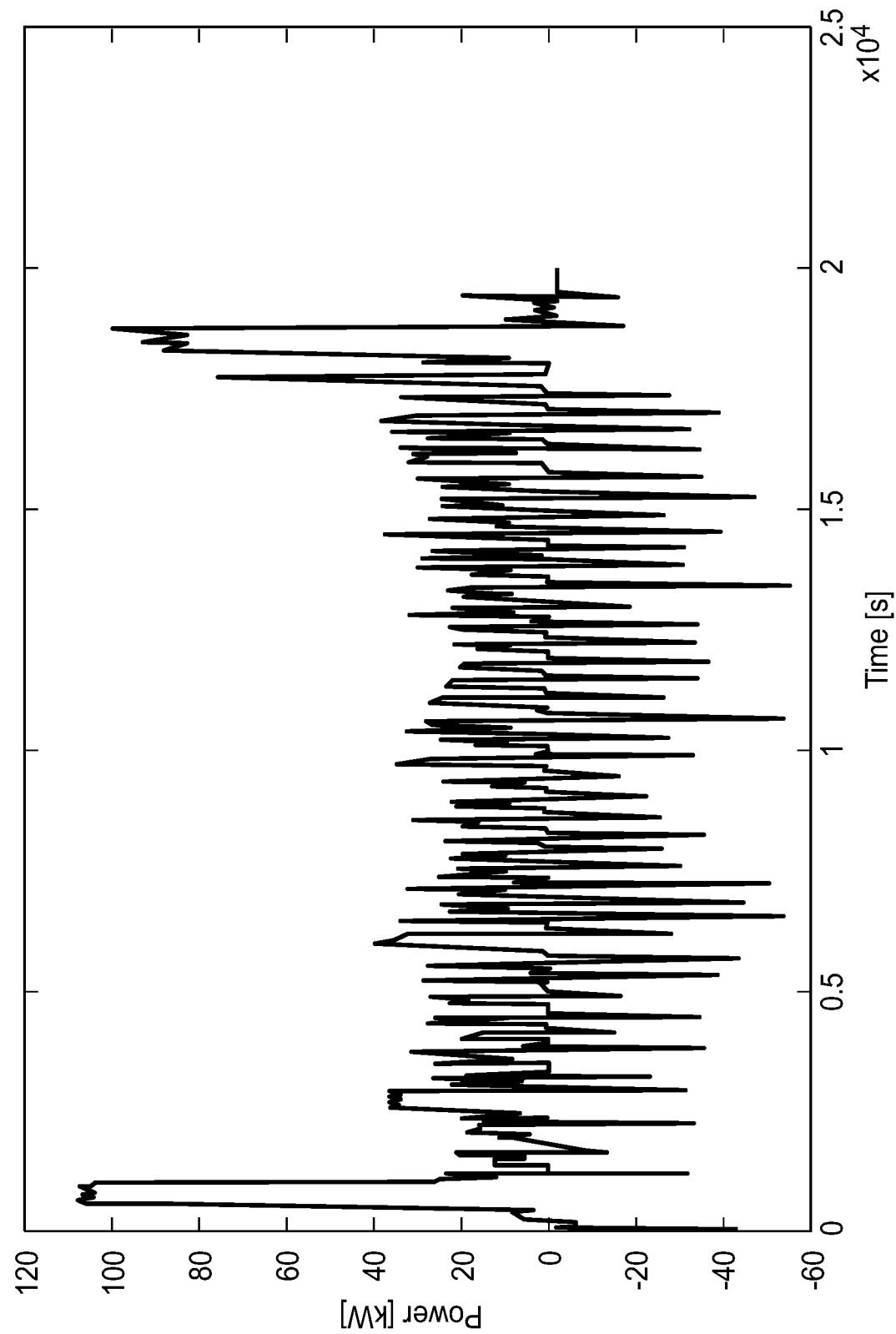
FIG. 22 is a second data visualization.
Figure 23:
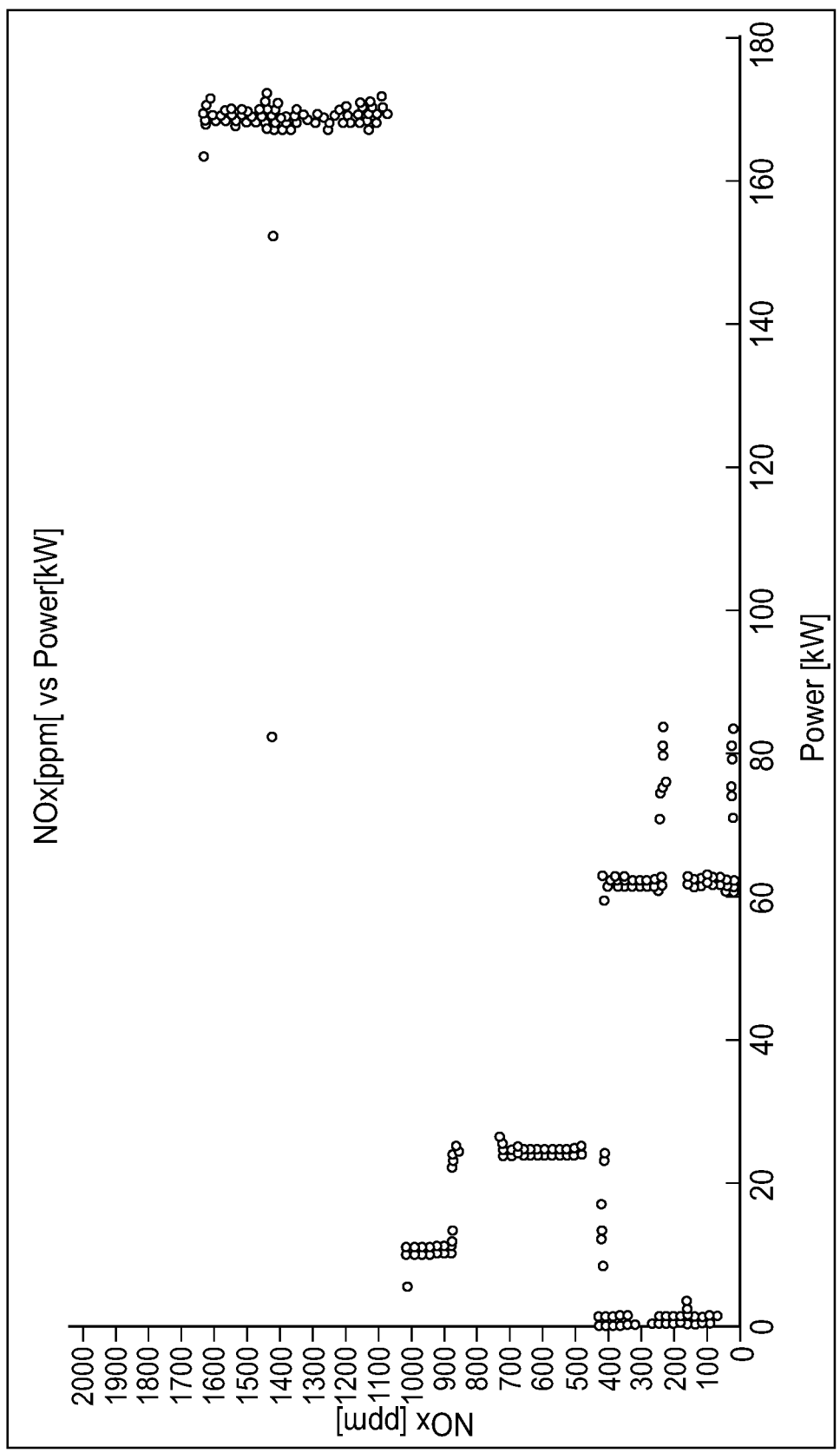
FIG. 23 is a third data visualization.
Figure 24:
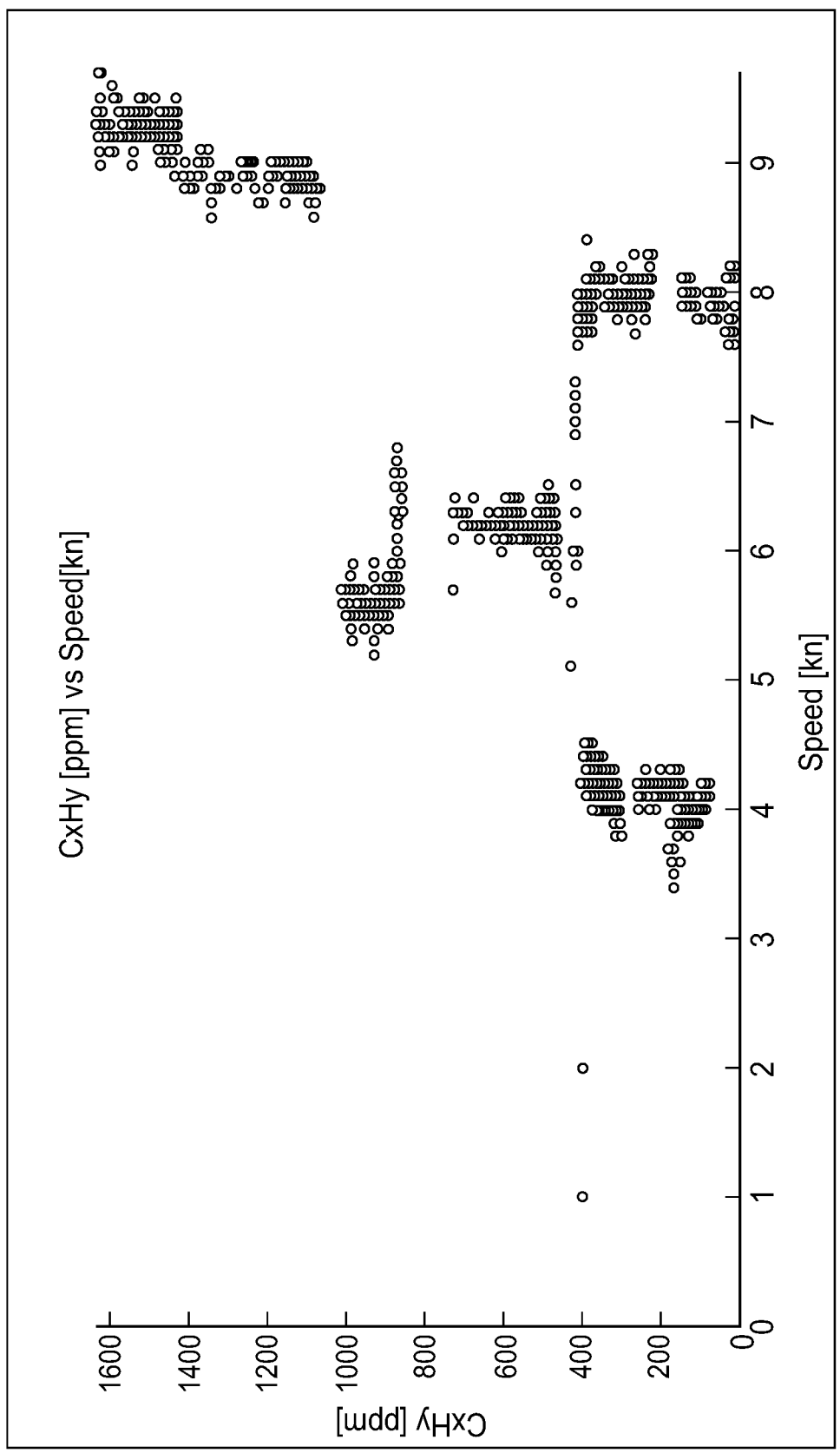
FIG. 24 is a fourth data visualization.
Figure 25:
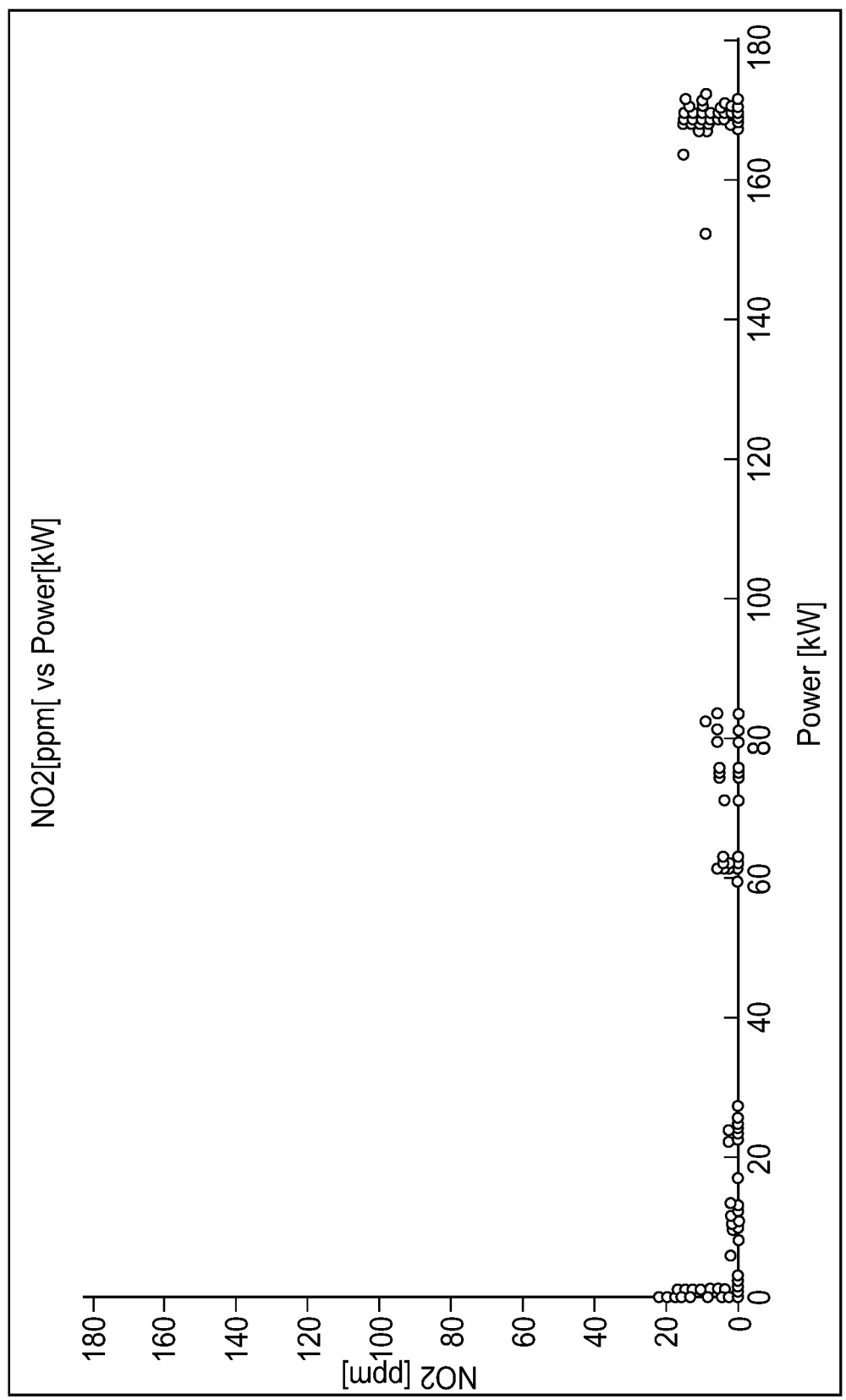
FIG. 25 is a fifth data visualization.
Figure 26:
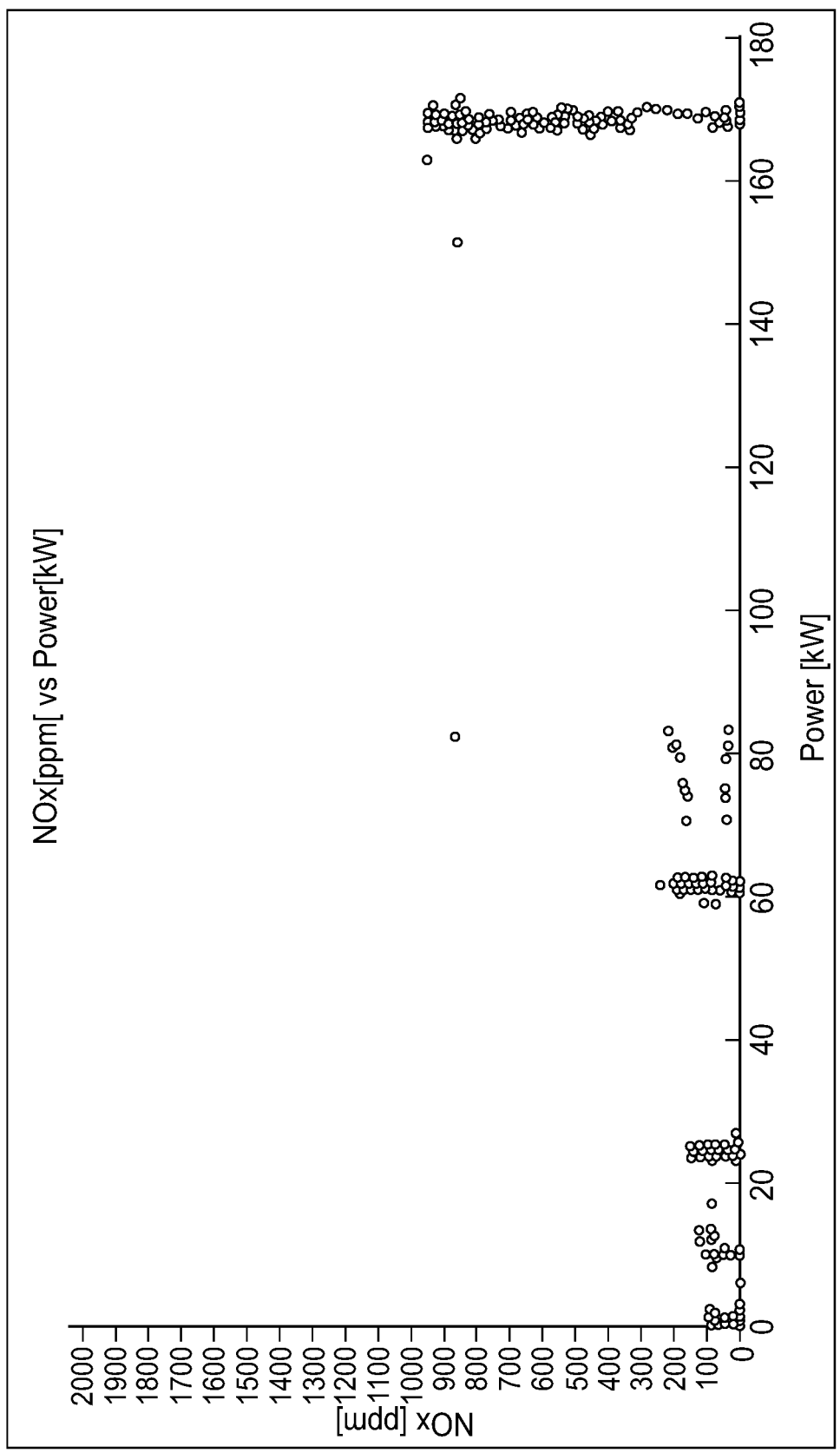
FIG. 26 is a sixth data visualization.

FIG. 21 exemplifies a power (kilowatts) versus speed (knots) plot for an Atlantic fishing boat. FIG. 22 exemplifies a plot of power (kilowatts) versus time (seconds) for one fishing trip for an Atlantic lobster boat. FIG. 23 exemplifies a plot of hydrocarbons generated (CxHy, parts per million) versus power (kilowatts). FIG. 24 exemplifies a plot of hydrocarbons (CxHy, parts per million) versus boat speed (knots). FIG. 25 exemplifies a plot of NO2 produced (parts per million) versus power (kilowatts). FIG. 26 exemplifies a plot of nitrogen oxides (NOx, parts per million) versus power (kilowatts). In general, power data can be presented versus one or more of speed of the boat over ground, time, RPM, fuel flow, etc. In general, emissions data can be presented versus one or more of time, power, boat speed, wave height, etc.

A system or method described herein may be used to provide initial estimates to a user for a vessel for which they have limited or no operational data. In some embodiments, a user is able to download (e.g., to a smartphone) a profile (e.g., from the remote server 112) fora vessel. The profile is matched to one of the vehicle classes, as described earlier, and the matched vessel class is then used to provide the user with initial estimates for the data parameters. The initial estimates are based entirely on data in the database (e.g., a database stored on the data storage device 114). In some embodiments, newly collected data can be used to refine the estimates.

A system or method described herein may be used to provide information to be used by insurance companies to determine, for example, driving habits of marine sector vessels or typical range of tour boats. A system or method described herein may be used by fleet managers to, for example, optimise operations through route analysis by predicting weather impacts on fuel use for a various routes.

A system or method described herein may be used to provide weather modeling validation data by using data from a boat in a region. For example boat motion data, boat anemometer readings, boat temperature readings and boat pressure readings may be similar to wave buoy motion data, anemometer readings, temperature readings, and pressure readings otherwise relied upon for weather model validation.

The following are example application scenarios.

Vessel A is a shrimp boat out of New Bedford that uses a system and associated method(s) described herein to get reliable data on how even a small change in bearing can improve fuel costs for the next leg of a given trip. For example, the vessel's captain may use a system and associated method(s) described herein to monitor the vessel's position relative to "navigational boundaries" that are both physical and operational, established by insurers or regulators. When planning the next trip, the captain can use a system and associated method(s) described herein to recommend optimal cost route options informed by predicted weather conditions and previous driving habits collected from multiple shrimp trap locations. A system and associated method(s) described herein may be used to continuously monitor the vessel's operating conditions and the local environmental conditions for generating alerts for system components that may need attention such as, but not limited to, one or more of engine performance, propeller fatigue, drive shaft slip/drag, battery levels, emission levels and more.

Cruise Line Operator A operates a fleet of 45 vessels and the fleet manger is responsible for ensuring these vessels are operating within safety, compliance, and/or cost management parameters. Without using a system and associated method(s) described herein the Cruise Line Operator A had no real time access to information from each vessel. Minimal data was captured manually during a trip and reported after each trip. However, with the system and/or method described herein, the data collected during the trip can be continuously pushed to the cloud. In addition, once the fleet manager had access to auto-collected data he determined that levels of inaccuracy in historical records were significantly off. When Cruise Line Operator A used one of the systems and associated method(s) described herein they also obtained access to a database which is a constantly growing source of relevant operational and predictive data. The system and associated method(s) described herein can be used by the fleet manager to monitor the fleet in real-time and to obtain notifications about vessels experiencing operational challenges (such as fuel flow spikes) or operator performance exceptions (erratic driving, etc.) as well as building efficient driving guidelines for his team. From a compliance perspective the fleet manager can accurately respond to inquiries about how much CO2 the fleet was using.

Pleasure Craft Rental Company A out of Long Beach, California offers pleasure crafts for rent to visitors. The manager of the San Diego operation uses a system and associated method(s) described herein to monitor the rental experience. For example, a system and associated method(s) described herein may be used to notify the manger when individual boats are having operational challenges, are in violation of boundaries (or specific insurance policies) or are being driven erratically in order to reduce the occurrence of such events. Having a system and associated method(s) described herein in place lowers the pleasure craft rental company's insurance costs which in turn allows them to offer more competitive pricing.

Marine Centre A is focused on increasing their understanding of complex coastal and marine systems by integrating research with student-centered, immersive education, with a continuing commitment to diversity and mentoring. Researchers at Marine Centre Aare interested in tracking and publishing the trends associated with the impact of coastal vessels on the environment. Access to a large, anonymized database of captured or measured vessel related data such as, but not limited to power consumption and/or environmental data is essential to the research. For example, researchers may leverage the database and associated method(s) described herein to develop alternative shipping lanes as a response to shifts in legislative/environmental policies while also ensuring that the data complies with privacy legislation.

Yacht Club A requires all members to have a system that performs at least one of the method(s) described herein installed so they can track and monitor all boats from a safety and performance perspective. The system and associated method(s) described herein may also be used during races to share the position of all boats and validate buoy navigation during races. This enables increased participation from racing fans allowing them to track progress on their smartphones. Owners like the confirmation they can get from the system and associated method(s) described herein as they decide on their next track and have access to information that is not always visible from the helm. The system and associated method(s) described herein may also be used to connect to other similar systems within a range of 100 meters to manage traffic and proximity and perform post race analysis which may include a range of performance metrics for review at the clubhouse and to help train crew to do better next time.

While the applicant's teachings described herein are in conjunction with various embodiments for illustrative purposes, it is not intended that the applicant's teachings be limited to such embodiments. On the contrary, the applicant's teachings described and illustrated herein encompass various alternatives, modifications, and equivalents, without generally departing from the embodiments described herein. For example, while the teachings described and shown herein may comprise certain elements/components and steps, modifications may be made as is known to those skilled in the art. For example, selected features from one or more of the example embodiments described herein in accordance with the teachings herein may be combined to create alternative embodiments that are not explicitly described. All values and sub-ranges within disclosed ranges are also disclosed. The subject matter described herein intends to cover and embrace all suitable changes in technology.

The invention claimed is:

1. A system comprising at least one processor for estimating an operational parameter of a subject vessel, the at least one processor being configured to:
    receive vessel data from the subject vessel, the vessel data including at least one actual data item of a set of possible data items that could be associated with the subject vessel, the set of possible data items including data about operation of the vessel and/or weather conditions and there are one or more missing data items;
    associate the vessel data with a vessel class, the subject vessel having one or more vessel parameters that fall within one or more parameter ranges of the vessel class;
    generate an estimated equivalent for at least one data item of the set of possible data items by a processing of the vessel data using a vessel-class based machine learning model that is trained using a training data from vessels belonging to the same vessel class of the subject vessel; and
    provide the estimated equivalent to a user by displaying the estimated equivalent on a screen, storing the estimated equivalent to a datastore and/or sending the estimated equivalent to a remote device.

2. The system of claim 1, wherein the vessel parameters include one or more of a vessel length of the subject vessel, an engine size of the subject vessel, and/or a weather system associated with a time and a location at which the vessel data was collected.

3. The system of claim 2, wherein the vessel data includes actual speed through water and at least one of actual fuel flow, actual speed over land, actual direction, actual weather conditions, actual vessel motion, actual torque output, actual drive shaft revolutions per minute, actual vessel power, and actual emission output of the subject vessel.

4. The system of claim 1, wherein the vessel data does not include the at least one data item of the set of possible data items that the vessel-class based machine learning model is adapted to generate the estimated equivalent of, such that the estimated equivalent may be used in the place of the at least one data item of the set of possible data items.

5. The system of claim 1, wherein the vessel data does not include actual torque output, actual drive shaft revolutions per minute, and actual vessel power, and the estimated equivalent includes an estimation of at least one of the torque output, the drive shaft revolutions per minute, and the vessel power.

6. The system of claim 1, wherein the training data includes torque data and wherein the vessel data is missing actual torque output, and the vessel-class based machine learning model is adapted to generate the estimated equivalent to include an estimation of the torque output.

7. The system of claim 1, wherein the vessel data does not include actual emission output, and the estimated equivalent includes an estimation of the emission output wherein the database used to train the machine learning model included emission data from the vessels of the class of the subject vessel.

8. The system of claim 1, wherein the at least one processor is further configured to:
    compare the estimated equivalent to a corresponding actual data item of the vessel data to generate a difference between the actual data item and the estimated equivalent; and
    generate an alert when the difference is greater than or lesser than a threshold or outside a range of acceptable values.

9. The system of claim 8, wherein the alert is a maintenance warning and suggests at least one operation system component for review, maintenance, repair, or replacement.

10. The system of claim 1, wherein the at least one process is further configured to receive third-party weather data corresponding to a time and a location or a nearby time and nearby location at which the vessel data was recorded, and wherein generating the estimated equivalent also includes processing the third-party weather data using the vessel-class based machine learning model, wherein the third-party weather data is a weather forecast corresponding to the time and the location at which the vessel data was recorded or the third-party weather data is a weather estimate corresponding to the time and the location at which the vessel data was recorded, the weather estimate based on third-party weather data recorded at a nearby location and/or a nearby time.

11. A portable data acquisition unit, comprising:
    a portable housing;
    a local data storage device contained in the housing;

a plurality of peripheral device couplings that are communicatively couplable to a plurality of peripheral devices including at least one operational system of a vessel and/or at least one sensor mounted to the vessel;

a communications module operable to transmit to and receive from a remote device; and a processor that is operatively coupled to the local data storage device, the plurality of peripheral device couplings and the communications module, the processor being configured to: (a) receive data from the at least one operational system of the vessel and/or the at least one sensor, respectively; and (b) store the data on the local data storage device and/or transmit the data via the communications module to the remote device.

12. The portable data acquisition unit of claim 11, wherein the at least one peripheral device couplings includes a coupling for a hydrophone and further comprising an inertial measurement unit contained in the portable housing and configured for measuring inertial measurement data and communicatively coupled to the processor for storage of the inertial measurement data to the data storage device.

13. A system comprising:

a subject vessel; and the portable data acquisition unit that is defined according to claim 12, the portable data acquisition unit being mounted on the subject vessel.

14. The system of claim 13, further comprising a hydrophone, wherein the hydrophone is configured to measure sound from the hull, propeller, and/or internal machinery of the subject vessel and is communicatively coupled to the peripheral device coupling to provide the sound as part of the sensor data.

15. The system of claim 14, wherein the system further comprises:

a remote data storage device; and a processor communicatively coupled to the remote data storage device to access a database stored on the remote data storage device, wherein the database includes vessel data received from the portable data acquisition unit, the vessel data including at least one actual data item of a set of possible data items that could be associated with the subject vessel, the set of possible data items including data about operation of the vessel and/or weather conditions and there are one or more missing data items; and wherein the processor is operable to:

associate the vessel data with a vessel class, the subject vessel having one or more vessel parameters that fall within one or more parameter ranges of the vessel class, and generate an estimated equivalent for at least one data item of the set of possible data items by processing the vessel data using a machine learning model, the machine learning model trained using a database of data from vessels of the class of the subject vessel.

16. A system comprising at least one processor, the at least one processor configured to:

receive data from a subject vessel over a period of time, the data including hydrophone data;

detect an abnormality in the hydrophone data;

associate the detected abnormality with an operational system component of the subject vessel; and generate a maintenance alert identifying the operational system component needs further attention.

17. The system of claim 16, wherein the hydrophone data is generated by a hydrophone configured to measure sound from at least one component selected from the group of a hull, a propeller, an engine, gearing, a motor, or a bearing of the vessel.

18. The system of claim 16, wherein the at least one processor is further configured to, prior to detecting an abnormality in the hydrophone data, process the hydrophone data to remove at least one frequency band, the at least one frequency band associated with voices or non-vessel equipment.

19. The system of claim 16, wherein the data further includes fuel flow data, and the at least one processor is configured to detect the abnormality in the hydrophone data by detecting the abnormality in the hydrophone data in view of the fuel flow data.

20. The system of claim 16, wherein the at least one processor is further configured to associate the data with a vessel class based on a vessel length of the subject vessel, an engine size of the subject vessel, and/or a weather system associated with a time and a location at which the vessel data was collected, and wherein detecting the abnormality in the hydrophone data includes a processing of the hydrophone data using a vessel-class based machine learning model that is trained using training data from vessels of the same vessel class as the subject vessel.

21. The system of claim 1, wherein the set of possible data items that could be associated with the subject vessel include actual fuel flow, actual speed through water, actual speed over land, actual direction, actual vessel motion, actual torque output, actual drive shaft revolutions per minute, actual vessel power, and/or actual emission output.

22. The system of claim 15, wherein the set of possible data items that could be associated with the subject vessel include actual fuel flow, actual speed through water, actual speed over land, actual direction, actual vessel motion, actual torque output, actual drive shaft revolutions per minute, actual vessel power, and/or actual emission output.

* * * * *